US012460450B2

(12) United States Patent
Wu

(10) Patent No.: US 12,460,450 B2
(45) Date of Patent: Nov. 4, 2025

(54) LOCK

(71) Applicant: SINOX CO., LTD., New Taipei (TW)

(72) Inventor: Chia-Ming Wu, New Taipei (TW)

(73) Assignee: SINOX CO., LTD, New Taipei (TW)

( * ) Notice: Subject to any disclaimer, the term of this patent is extended or adjusted under 35 U.S.C. 154(b) by 110 days.

(21) Appl. No.: 18/207,284

(22) Filed: Jun. 8, 2023

(65) Prior Publication Data

US 2023/0399876 A1 Dec. 14, 2023

(30) Foreign Application Priority Data

Jun. 9, 2022 (TW) ................................ 111206106

(51) Int. Cl.
*E05B 73/00* (2006.01)

(52) U.S. Cl.
CPC ................................ *E05B 73/0082* (2013.01)

(58) Field of Classification Search
CPC . E05B 67/003; E05B 73/0005; E05B 73/0082
See application file for complete search history.

(56) References Cited

U.S. PATENT DOCUMENTS 6,058,744 A * 5/2000 Ling .................. E05B 73/0082 70/312
6,619,081 B1 * 9/2003 Yu ...................... E05B 73/0005 70/58
7,401,481 B1 * 7/2008 Lin ..................... E05B 73/0082 70/58
8,991,225 B2 * 3/2015 Wu ..................... E05B 73/0082 70/58
10,718,138 B2 * 7/2020 Wu ..................... E05B 73/0082
11,187,014 B2 * 11/2021 Kao .................... E05B 73/0082
11,434,659 B2 * 9/2022 Wu ..................... E05B 73/0082
2008/0034816 A1 * 2/2008 Lu ....................... E05B 73/0082 70/58
2021/0025200 A1 * 1/2021 Wu ..................... E05B 73/0082
2022/0235586 A1 * 7/2022 Pan ..................... E05B 73/0082
2023/0135591 A1 * 5/2023 Yang .................. E05B 73/0082 70/51
2023/0243191 A1 * 8/2023 Wang ................. E05B 73/0082 70/58

* cited by examiner

*Primary Examiner* — Christopher J Boswell
(74) *Attorney, Agent, or Firm* — Birch, Stewart, Kolasch & Birch, LLP

(57) ABSTRACT

A lock of the present invention includes a housing, a rotating hook, a driving apparatus, and a lock body. An end of the housing includes a front-end opening. The front-end opening faces a same direction as an extending direction of an X-axis, and deviates from a center of a section parallel to a Y-Z plane of the end of the housing that includes the front-end opening, where the X-axis, a Y-axis, and a Z-axis are orthogonal. The rotating hook is arranged in the housing and is rotatable relative to the housing, and includes a front end and a rear end, where the front end at least partially extends out of the front-end opening, and the rear end extends in an opposite direction to the front end. The driving apparatus is arranged in the housing and is movable to change an opening width of the front end. The lock body is arranged in the housing, and when the lock body is locked, the lock body restricts movement of the driving apparatus.

12 Claims, 25 Drawing Sheets

LOCK

TECHNICAL FIELD

The present invention relates to a lock, and further relates to a lock for an electronic apparatus.

BACKGROUND

In modern life, consumer electronic products play an important role. Together with today's rapid lifestyle and people's demands for up-to-date information, portable electronic products have become one of necessities for people. However, these products have an increased possibility of being lost or stolen because these products are highly priced and easily sold for money.

In order to prevent these products from being stolen by another person, a lock, for example, a notebook computer lock, is designed. The lock can be connected to an anti-theft lock hole of an electronic product through a lock bracket, and then movement of the lock bracket is controlled by using a lock core mechanism, to complete an objective of performing unlocking and locking. However, electronic apparatuses have an increasingly thin design, but a volume of a lock is difficult to be reduced based on a mechanism design. It is also known that a lock bracket of the lock extends from a center of one end of the lock, so that it can be learned that, when the lock is attached to a thin electronic apparatus, it is easy to cause the electronic apparatus to be unable to be stably placed on a desktop, resulting in inconvenience in use. In addition, specifications of anti-theft lock holes are different, so that a user needs to purchase/carry a lock with a corresponding lock bracket according to the specifications of the anti-theft lock holes. This is uneconomical, and also inconvenient in use.

SUMMARY

One of objectives of the present invention is to provide a lock, and the lock enables a thin electronic apparatus to be stably placed on a supporting surface when the lock is attached to the thin electronic apparatus, to provide better use convenience.

Another objective of the present invention is to provide a lock that can be used for lock holes of different sizes, to provide better use convenience.

The lock of the present invention includes a housing, a rotating hook, a driving apparatus, and a lock body. An end of the housing includes a front-end opening. The rotating hook is arranged in the housing and is rotatable relative to the housing, and includes a front end and a rear end, where the front end at least partially extends out of the front-end opening, and the rear end extends in an opposite direction to the front end. The driving apparatus is arranged in the housing and is movable to change an opening width of the front end. The lock body is arranged in the housing, and when the lock body is locked, the lock body restricts movement of the driving apparatus.

In an embodiment of the present invention, the front-end opening extends in a same direction as an X-axis, and deviates from a center of a section parallel to a Y-Z plane of the end of the housing that includes the front-end opening, where the X-axis, a Y-axis, and a Z-axis are orthogonal.

In an embodiment of the present invention, the rear end is provided with a driving groove, and the driving apparatus is provided with a driving part extending into a driving portion of the driving groove along a Z-axis direction. When the lock body is unlocked, the driving portion may move along the X-axis direction to rotate the rotating hook relative to the housing along a plane parallel to an X-Y plane to change the opening width of the front end. When the lock body is locked, the lock body restricts the movement of the driving apparatus.

In an embodiment of the present invention, the driving apparatus includes a force applying part, a first driving part, a second driving part, a first elastic apparatus, and a second elastic apparatus. The force applying part penetrates the housing, is movable along a plane parallel to the Y-Z plane, and is provided with a force applying portion arranged in the housing. The first driving part is arranged in the housing, abuts against the force applying portion, and is movable along the X-axis direction. The second driving part is arranged between the first driving part and the rotating hook in the housing, abuts against the first driving part, and is movable along the X-axis direction, and the second driving part includes the driving portion. The first elastic apparatus is arranged at a side of the first driving part to provide first elastic force, so that the first driving part approaches the second driving part. The second elastic apparatus is arranged at a side of the second driving part to provide second elastic force, so that the second driving part is away from the rotating hook. A component of the first elastic force along the X-axis direction is larger than a component of the second elastic force along the X-axis direction. When the lock body is unlocked, the force applying part is movable towards inside of the housing, pushes the first driving part to move along the X-axis direction to be away from the rotating hook, so as to move the second driving part along the X-axis direction to be away from the rotating hook, and drives the driving portion to move along the X-axis direction to rotate the rotating hook relative to the housing along the plane parallel to the X-Y plane.

In an embodiment of the present invention, the lock body includes a locking piece. When the lock body is locked, the locking piece is located on a path of the first driving part moving along the X-axis direction to restrict the first driving part moving along the X-axis direction.

In an embodiment of the present invention, the first driving part further includes a guide slope abutting against the second driving part, and the guide slope is provided with a plurality of steps having a segment difference in the X-axis direction. The first driving part is rotatable along the plane parallel to the Y-Z plane to make one of the plurality of steps abuts against the second driving part and change a position of the second driving part in the X-axis direction, thereby driving the driving portion to move along the X-axis direction to rotate the rotating hook relative to the housing along the plane parallel to the X-Y plane and changing the opening width of the front end.

In an embodiment of the present invention, the lock further includes a third driving part arranged on another side of the first driving part relative to the second driving part. When the lock body is unlocked, the third driving part can be clamped with the first driving part and drive the first driving part to rotate along the plane parallel to the Y-Z plane. When the lock body is locked, the locking piece is clamped with the third driving part to restrict the third driving part rotating along the plane parallel to the Y-Z plane.

In an embodiment of the present invention, the first driving part includes a limiting pin, arranged at an end of the first driving part adjacent to the third driving part. The third driving part includes a limiting part, arranged at an end that is on a side surface of the third driving part and that is adjacent to the first driving part. The third driving part is movable towards the first driving part, so that the limiting part is clamped with the limiting pin.

In an embodiment of the present invention, the third driving part includes a limiting groove, arranged at a position outside the limiting part on the side surface of the third driving part along the X-axis direction. When the lock body is locked, the locking piece extends into the limiting groove to restrict the third driving part rotating along the plane parallel to the Y-Z plane.

DETAILED DESCRIPTION

Figure 1A:
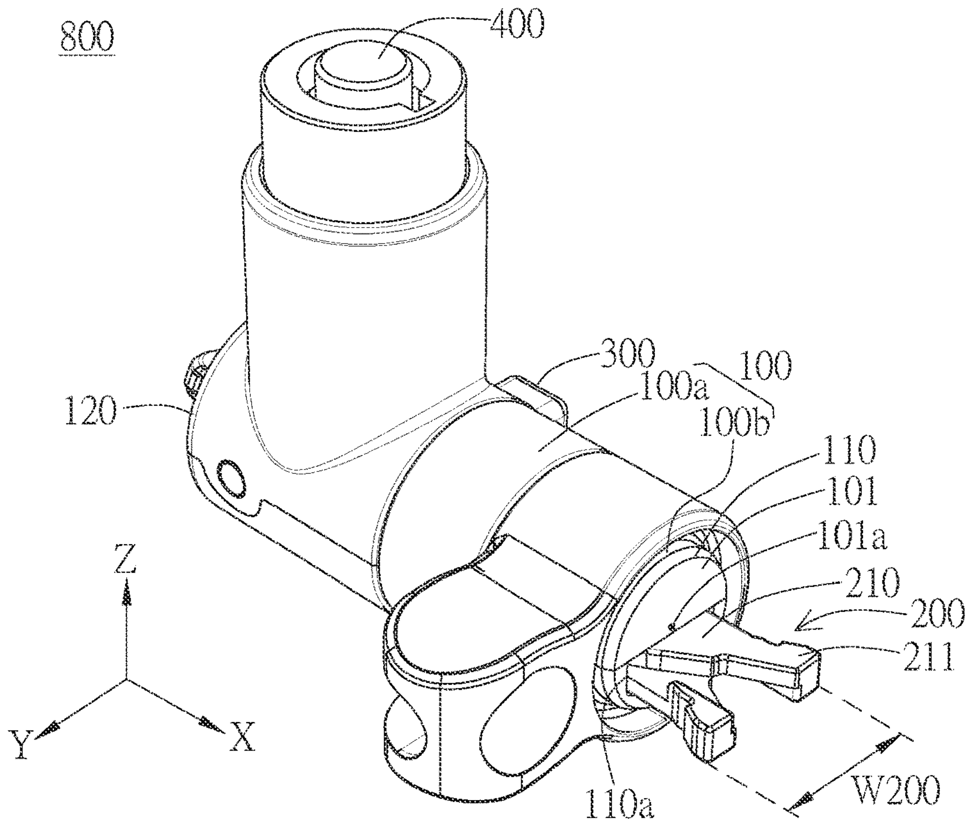
FIG. 1A to 1H are schematic diagrams of embodiments of a lock of the present invention.
Figure 1B:
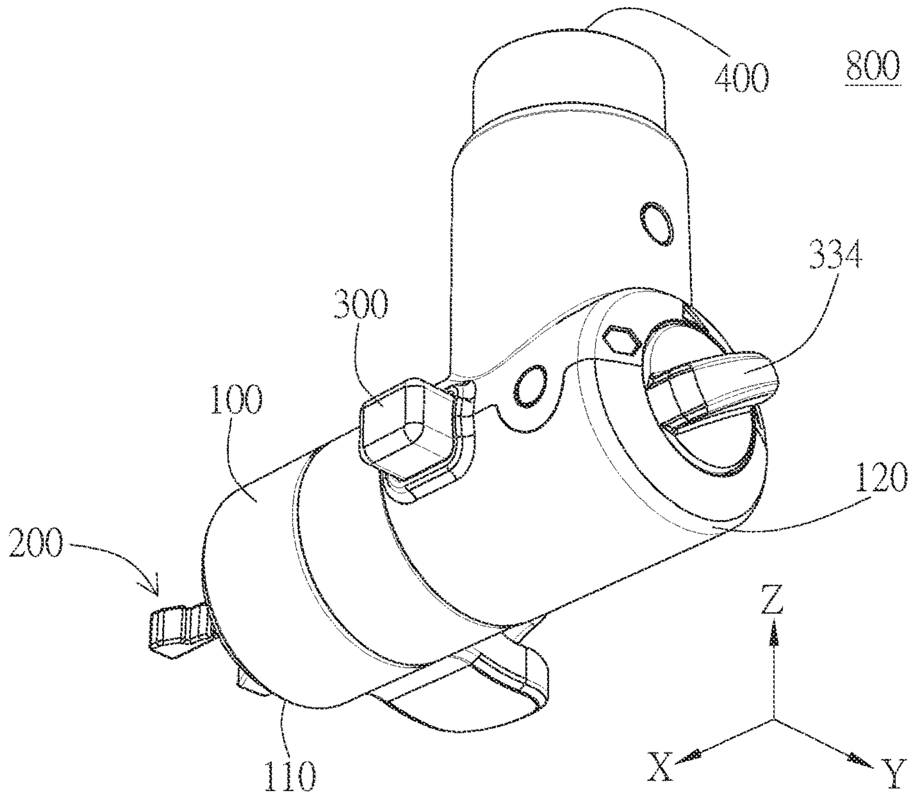
Figure 1C:
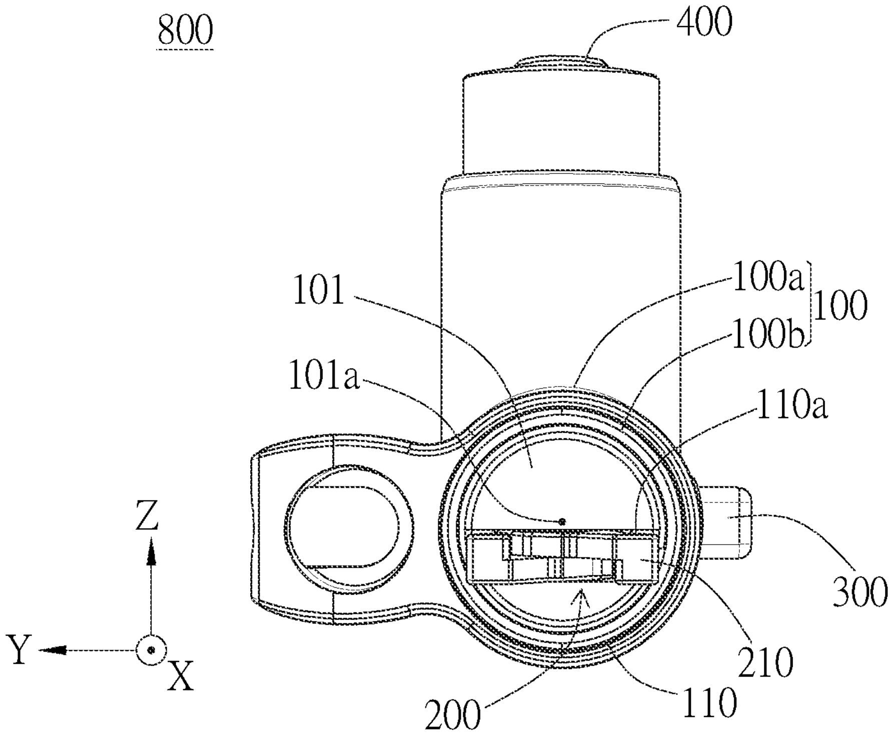
Figure 1D:
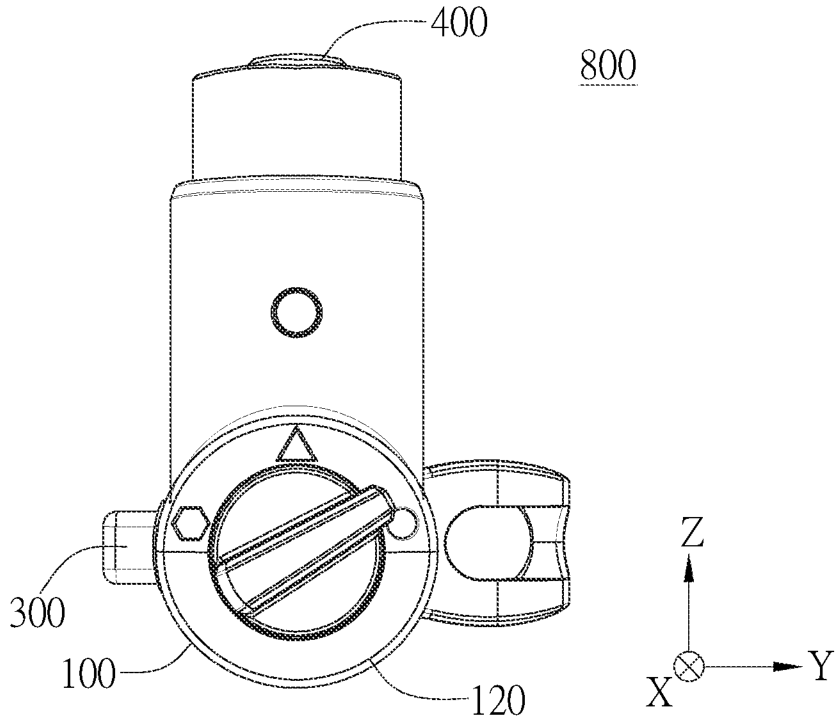
Figure 1E:
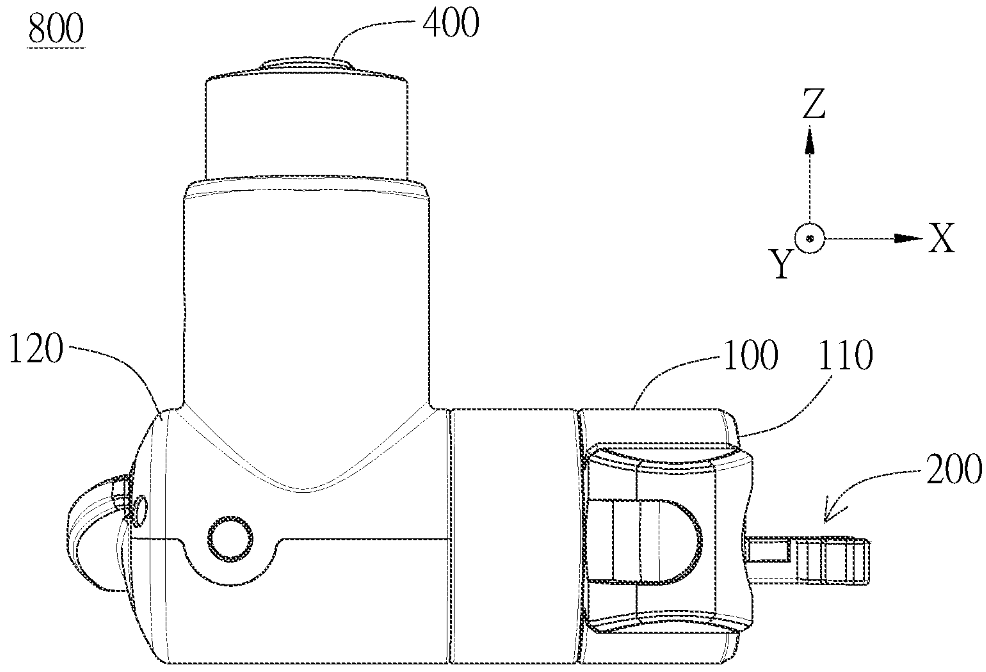
Figure 1F:
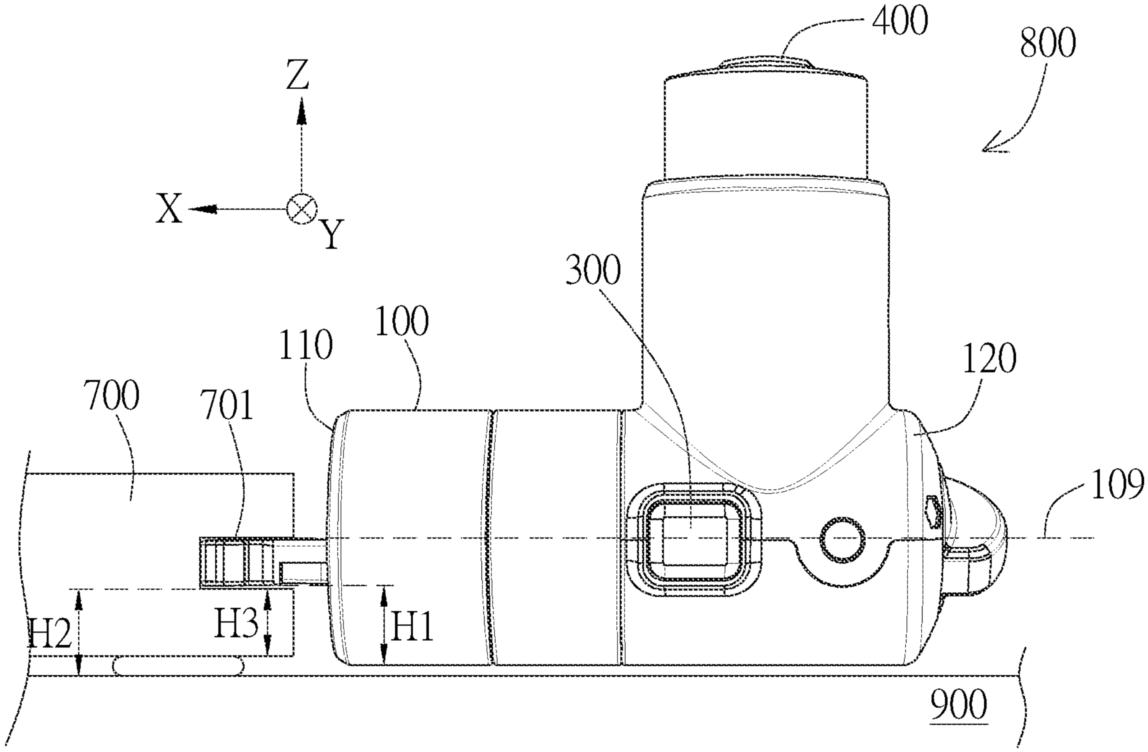
Figure 1G:
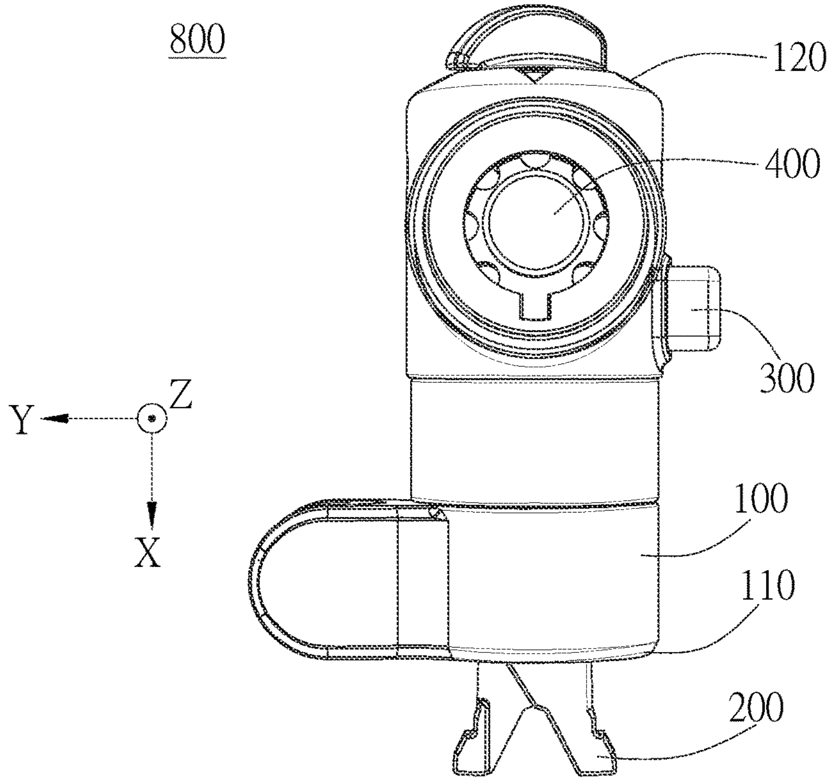
Figure 1H:
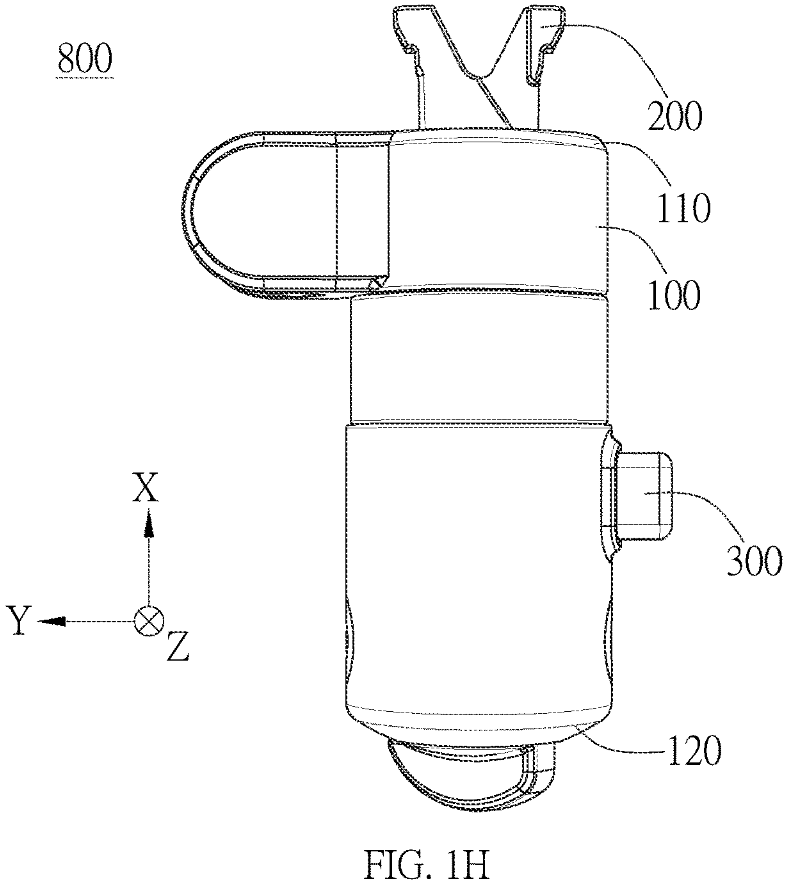

The following describes implementations of a connecting assembly disclosed in the present invention through specific embodiments with reference to accompanying drawings. A person skilled in the art can understand advantages and effects of the present invention from the content disclosed in this specification. However, the content disclosed in the following is not intended to limit the protection scope of the present invention, and without departing from the spirit of the present invention, the person skilled in the art may implement the present invention in other different embodiments based on different views and applications. In the accompanying drawings, the thicknesses of layers, films, panels, areas, and the like are enlarged for clarity. Throughout the specification, same reference numerals indicate same elements. It should be understood that when an element such as a layer, film, area, or substrate is referred to as being "on" or "connected" to another element, it may be directly on or connected to the another element, or intervening elements may also be present. In contrast, when an element is referred to as being "directly on" or "directly connected to" another element, there are no intervening elements present. As used herein, "connection" may refer to a physical and/or electrical connection. Furthermore, an "electrical connection" or "coupling" may include another element between two elements.

It should be understood that although terms such as "first," "second," "third," in this specification may be used for describing various elements, components, areas, layers, and/or parts, the elements, components, areas, layers, and/or parts are not limited by such terms. The terms are only used to distinguish one element, component, area, layer, or part from another element, component, area, layer, or part. Accordingly, the "first element," "component," "area," "layer," or "part" discussed below may be referred to as a second element, component, area, layer, or part without departing from the teachings of the present invention.

In addition, spatially relative terms such as "below", "bottom", "on" or "top" are used in this specification to describe a relationship between one element and another element, as shown in the figures. It should be understood that such relative terms are intended to encompass different orientations of the apparatus in addition to the orientation depicted in the figures. For example, if the apparatus in one accompanying drawing is flipped, elements described as being on "lower" sides of other elements are to be oriented on "upper" sides of the other elements. Thus, the term "upper" encompasses both the lower and above orientations depending on the spatial orientation of the apparatus. Similarly, if the apparatus in the figures is turned over, an element described as being "upper" or "lower" relative to another element will then be "above" or "upper" relative to the other element. Therefore, the exemplary terms "upper" or "lower" encompasses both the upper and lower orientations.

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Furthermore, the terms "about", "approximately" or "substantially" used herein may select a more acceptable deviation range or standard deviation according to optical properties, etching properties or other properties, and may not to apply one standard deviation to all the properties.

A lock of the present invention is used for an electronic apparatus (not shown), to connect to a lock hole of the electronic apparatus (not shown). The electronic apparatus is preferably portable, for example, but is not limited to a notebook computer, a tablet computer, a mobile phone, an e-book, a digital photo frame, a global positioning system navigation machine, a mobile network apparatus, a personal digital assistant, a digital walkman, an electronic dictionary, or the like.

In an embodiment shown in FIG. 1A to 2B, a lock 800 of the present invention includes a housing 100, a rotating hook 200, a driving apparatus 300, and a lock body 400. A front end 110 of the housing 100 includes a front-end opening 110*a*. The rotating hook 200 is arranged in the housing 100 and rotatable relative to the housing 100. In an embodiment shown in FIGS. 2A and 2B, the rotating hook 200 includes a front end 210 and a rear end 220, where the front end 210 extends at least partially from the front-end opening 110*a*, an end edge of the front end 210 may include a hook portion 211 extending laterally to facilitate clamping to a side wall of a lock hole, and the rear end 220 extends in an opposite direction to the front end 210. In this embodiment, the two rotating hooks 200 are rotatable relative to the housing 100 along a plane parallel to an X-Y plane and are in a shape of scissors. However, in different embodiments, there may be only one rotating hook 200 or more than two rotating hooks 200, and is not limited to be in the shape of scissors. In addition, in an embodiment, the rotating hook 200 is rotatable relative to the housing 100 along an X-axis direction.

Figure 2A:
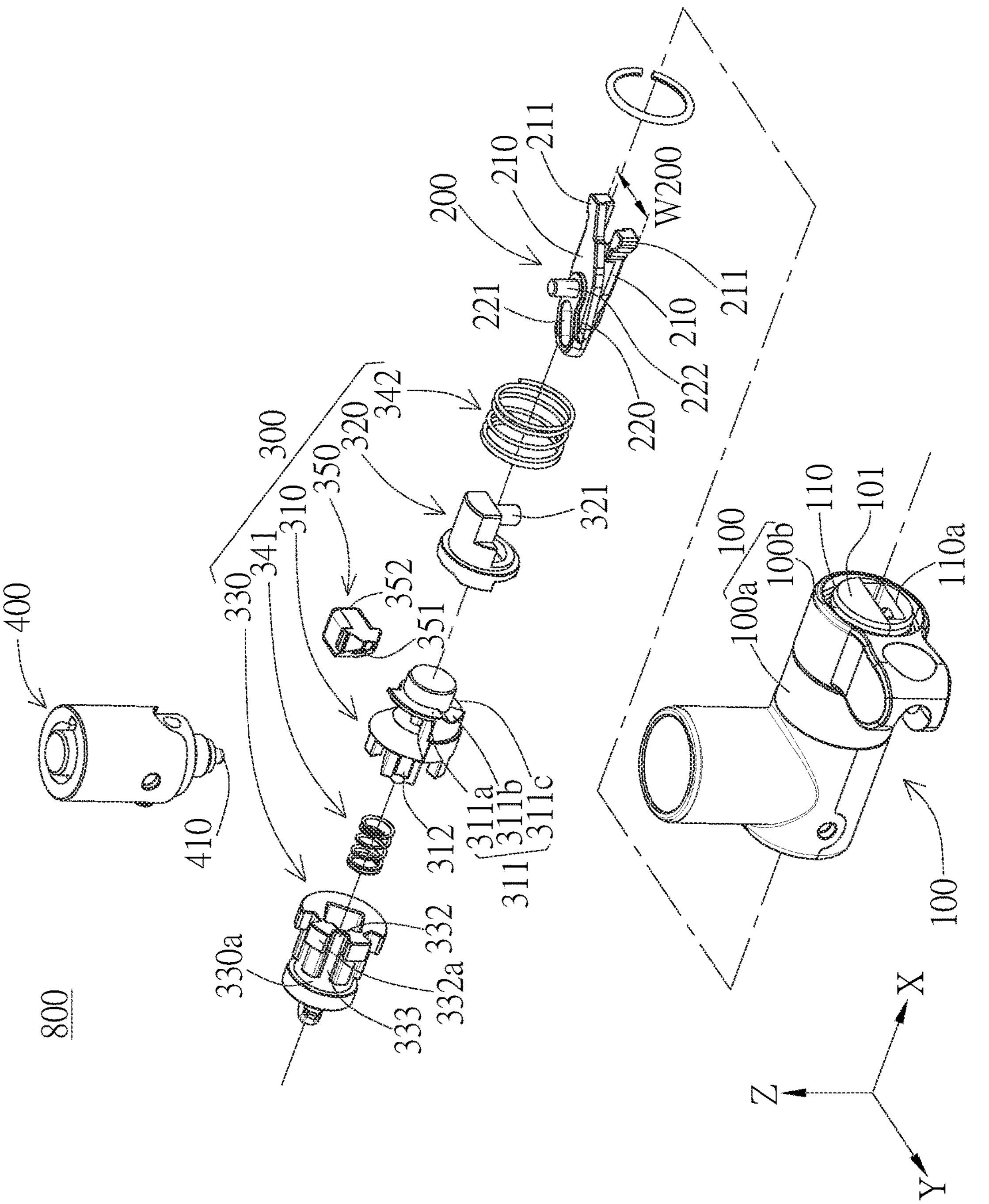
FIGS. 2A and 2B are exploded views of embodiments of a lock of the present invention.

Further, in an embodiment shown in FIG. 2A, the housing 100 may include an outer housing 100*a* and an inner housing 100*b*, where the inner housing 100*b* is sleeved on the outer housing 100*a* and is rotatable relative to the outer housing 100*a* along the X-axis direction. The rotating hook 200 is axially connected to the inner housing 100*b* with a pivot 222 so as to be rotatable relative to the housing 100 along the X-axis direction. However, in different embodiments, the housing 100 has an integrated design, and the rotating hook 200 is directly axially connected to the housing 100 by the pivot 222, so that the rotating hook is only rotatable relative to the housing 100 along the plane parallel to the X-Y plane and is not rotatable relative to the housing 100 along the X-axis direction.

In the embodiment shown in FIG. 1A to 2B, the driving apparatus 300 is arranged in the housing 100, and is movable to change an opening width W200 of the front end 210. The lock body 400 is arranged in the housing 100, and when the lock body 400 is locked, the lock body 400 restricts movement of the driving apparatus 300. In an embodiment shown in FIGS. 1A and 1C, a front-end opening 110*a* faces a same direction as an extending direction of the X-axis and deviates from a center of a section parallel to a Y-Z plane of the front end 110. The X-axis, a Y-axis, and a Z-axis are orthogonal. In this embodiment, the front end 110 includes a front end surface 101, and the front-end opening 110*a* is arranged on the front end surface 101 and deviates downward from a center 101*a* of the front end surface 101. To be specific, the front-end opening 110*a* is not substantially located at the center of the front end surface 101. Accordingly, the rotating hook 200 may protrude from a position deviating from the center. In an embodiment shown in FIG. 1F, because the rotating hook 200 of the lock 800 of the present invention deviates from an axis 109 to a lower side and extends out of the housing 100, that is, a height H1 of the housing 100 below a plane in which the rotating hook 200 is located is small. Therefore, when the rotating hook 200 of the lock 800 extends into a lock hole 701 of a thin electronic apparatus 700, the electronic apparatus 700 may still be stably placed on a supporting surface 900 such as a desktop. When the electronic apparatus 700 is placed on the supporting surface 900, the height H1 of the housing 100 below the plane in which the rotating hook 200 is located is less than a height H2 of a plane in which the lock hole 701 is located from the supporting surface 900, and more preferably less than a height H3 of the electronic apparatus 700 below a plane in which the lock hole 701 is located.

Figure 2B:
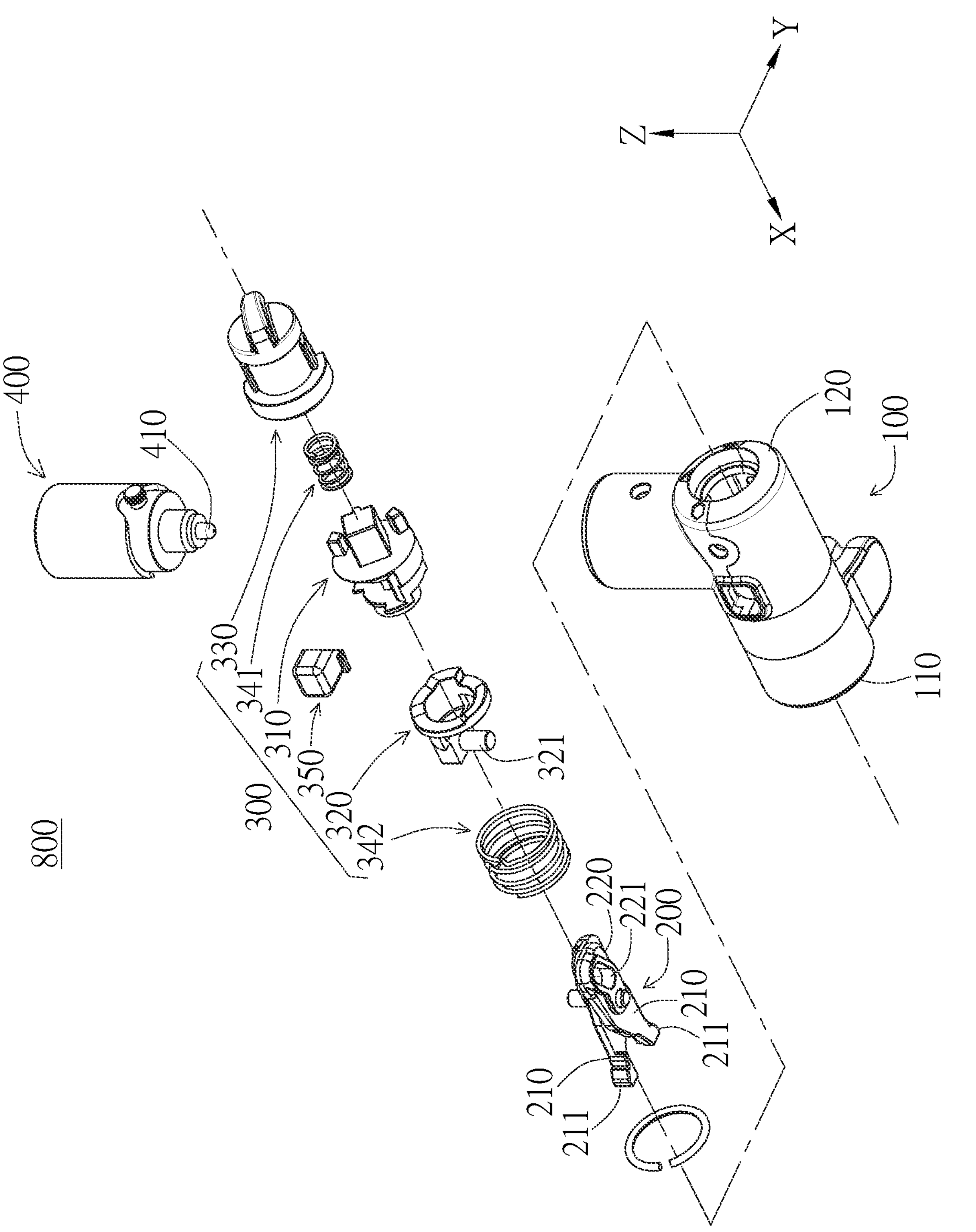

In the embodiment shown in FIGS. 2A and 2B, the rear end 220 of the rotating hook 200 includes a driving groove 221, and the driving apparatus 300 includes a driving portion 321 extending into the driving groove 221 along a Z-axis direction. When the lock body 400 is unlocked, the driving portion 321 is movable along the X-axis direction to rotate the rotating hook 200 axially connected to the housing 100 along the plane parallel to the X-Y plane relative to the housing 100, thereby changing the opening width W200 of the front end 210. When the lock body 400 is locked, the lock body 400 restricts the movement of the driving apparatus 300. The lock body 400 may be a lock body having a key lock core, a number lock core, and the like.

More specifically, in the embodiment as shown in FIGS. 2A and 2B, the driving apparatus 300 includes a force applying part 350, a first driving part 310, a second driving part 320, a first elastic apparatus 341, and a second elastic apparatus 342. The force applying part 350 penetrates the housing 100 and is movable along the plane parallel to the Y-Z plane, and preferably along a Y-axis direction. The force applying part 350 includes a force applying portion 351 arranged in the housing 100 and a first force receiving part 352 located outside the housing 100. The first driving part 310 is arranged in the housing 100, abuts against the force applying portion 351, and is movable along the X-axis direction. Further, at least one of the force applying portion 351 and a part of the first driving part 310 abutting against the force applying portion 351 are preferably a slope, and when the first force receiving part 352 is subjected to an external force applied by a user and the force applying part 350 is driven to move towards an inside of the housing 100 along the Y-axis direction, a component of the external force can be generated to push the first driving part 310 to move the rotating hook 200 backwards along the X-axis direction.

In the embodiment shown in FIGS. 2A and 2B, the second driving part 320 is arranged between the first driving part 310 and the rotating hook 200 in the housing 100. The second driving part 320 abuts against the first driving part 310 and is movable along the X-axis direction. The second driving part 320 includes the driving portion 321. For example, the first elastic apparatus 341 of a spring is arranged at one side of the first driving part 310 to provide first elastic force so that the first driving part 310 approaches the second driving part 320. The second elastic apparatus 342, such as a spring, is arranged at one side of the second driving part 320 to provide second elastic force so as to keep the second driving part 320 away from the rotating hook 200. A component of the first elastic force along the X-axis direction is greater than a component of the second elastic force along the X-axis direction. Accordingly, when the first force receiving portion 352 is not subjected to an external force, the first driving part 310 is pushed by the first elastic force to abut against the force applying part 350, and the second driving part 320 is pushed by the second elastic force to abut against the first driving part 310 to be away from the rotating hook 200. When the external force is applied to the first force receiving part 352 and a sum of the component of the external force along the X-axis direction and the component of the second elastic force along the X-axis direction is greater than the component of the first elastic force along the X-axis direction, the second driving part 320 can be away from the rotating hook 200.

Figure 3A:
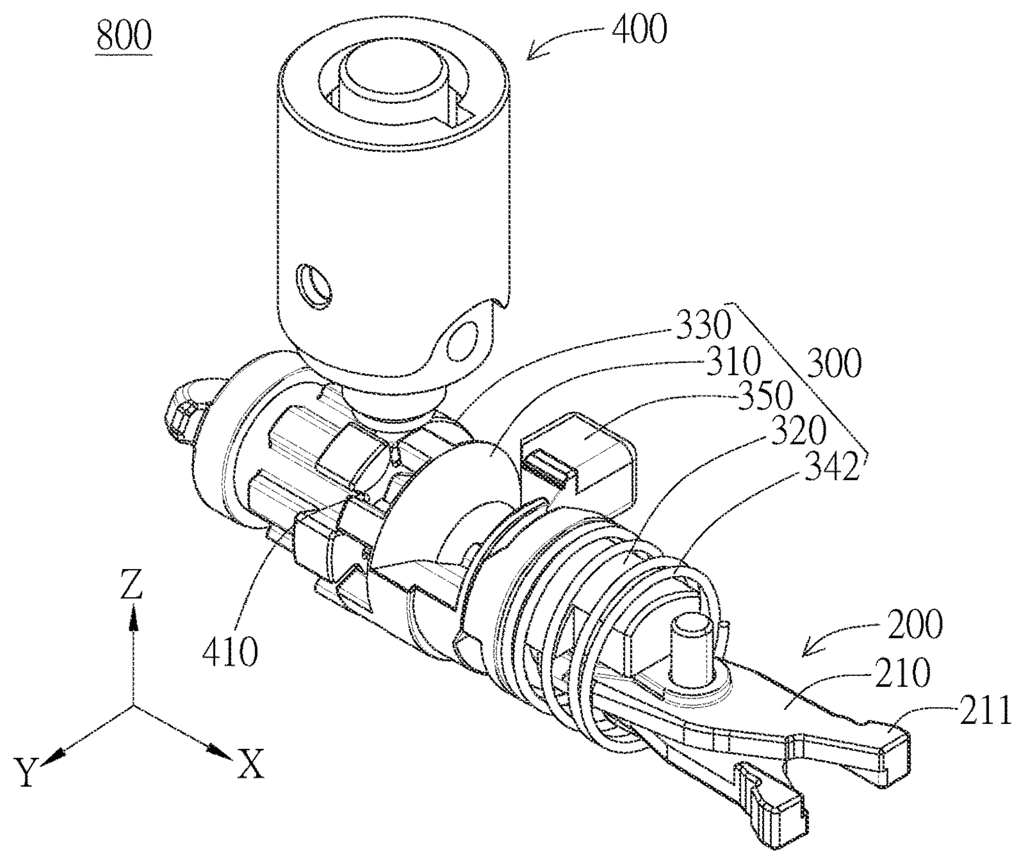
FIG. 3A to 5E are schematic diagrams of embodiments of unlocking and locking of a lock of the present invention.
Figure 3B:
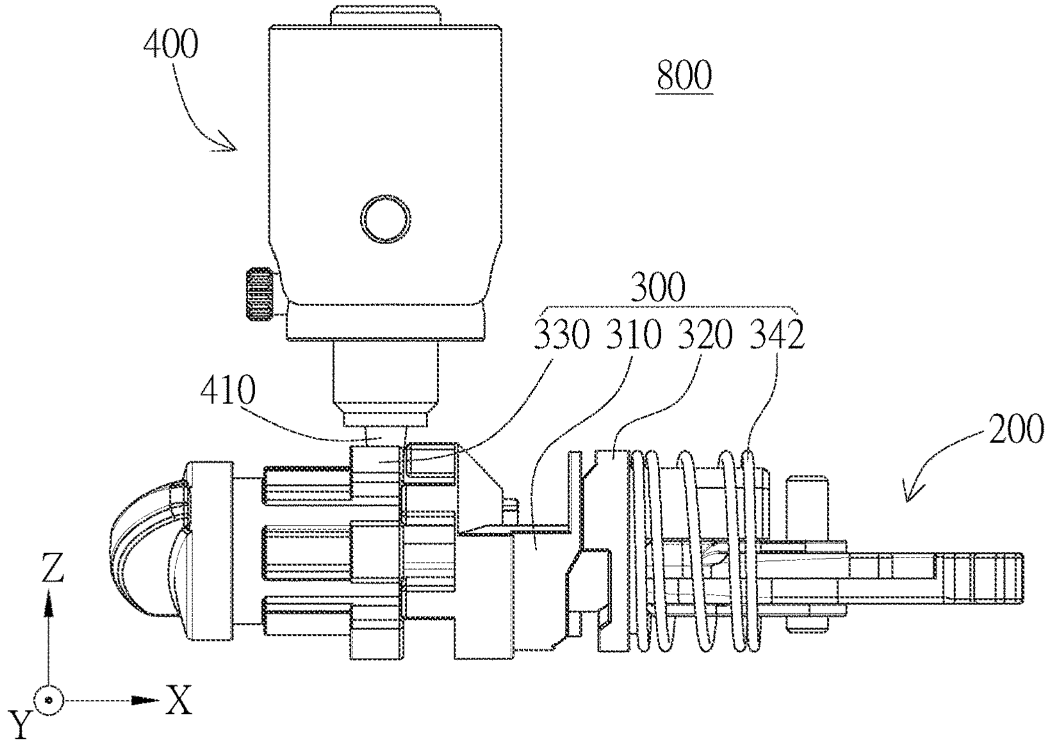
Figure 3C:
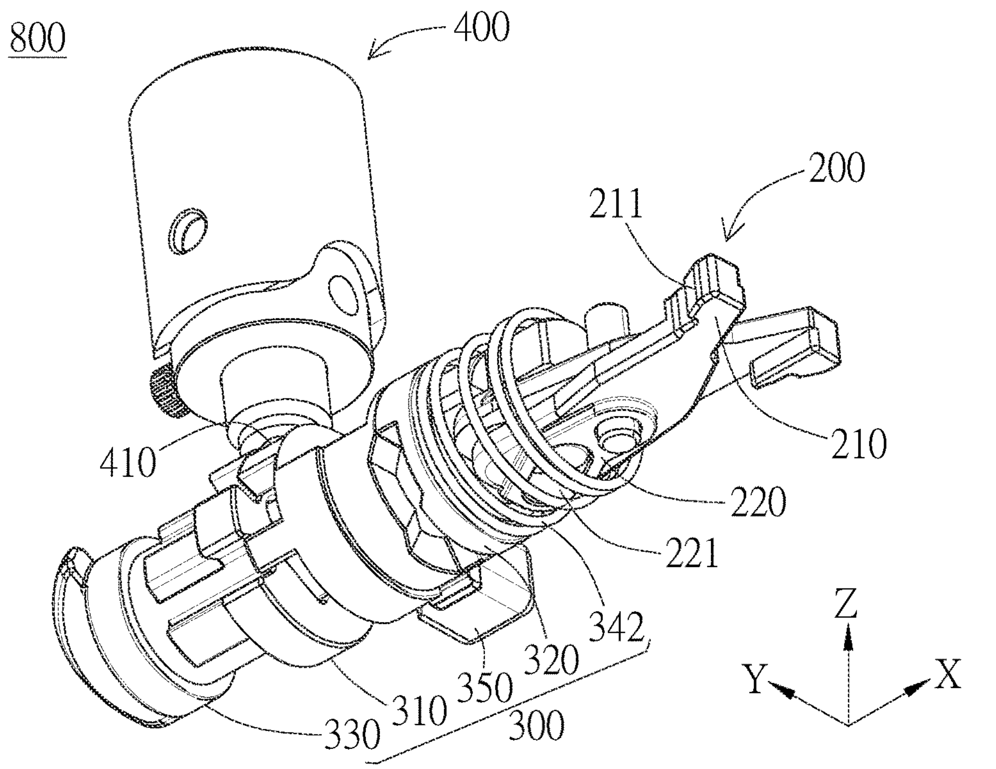
Figure 3D:
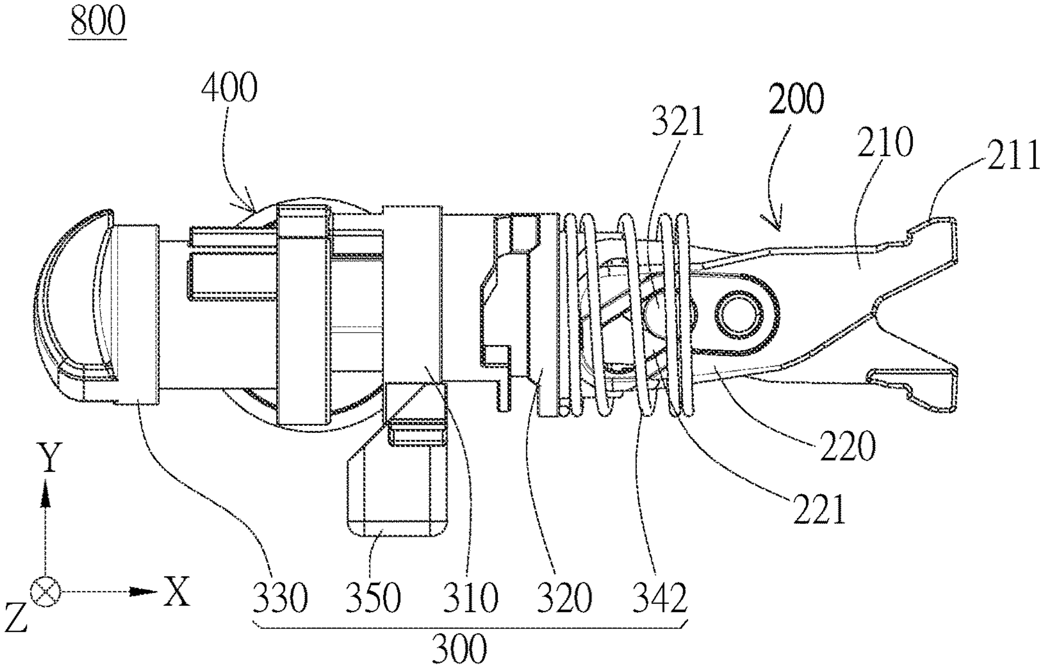
Figure 3E:
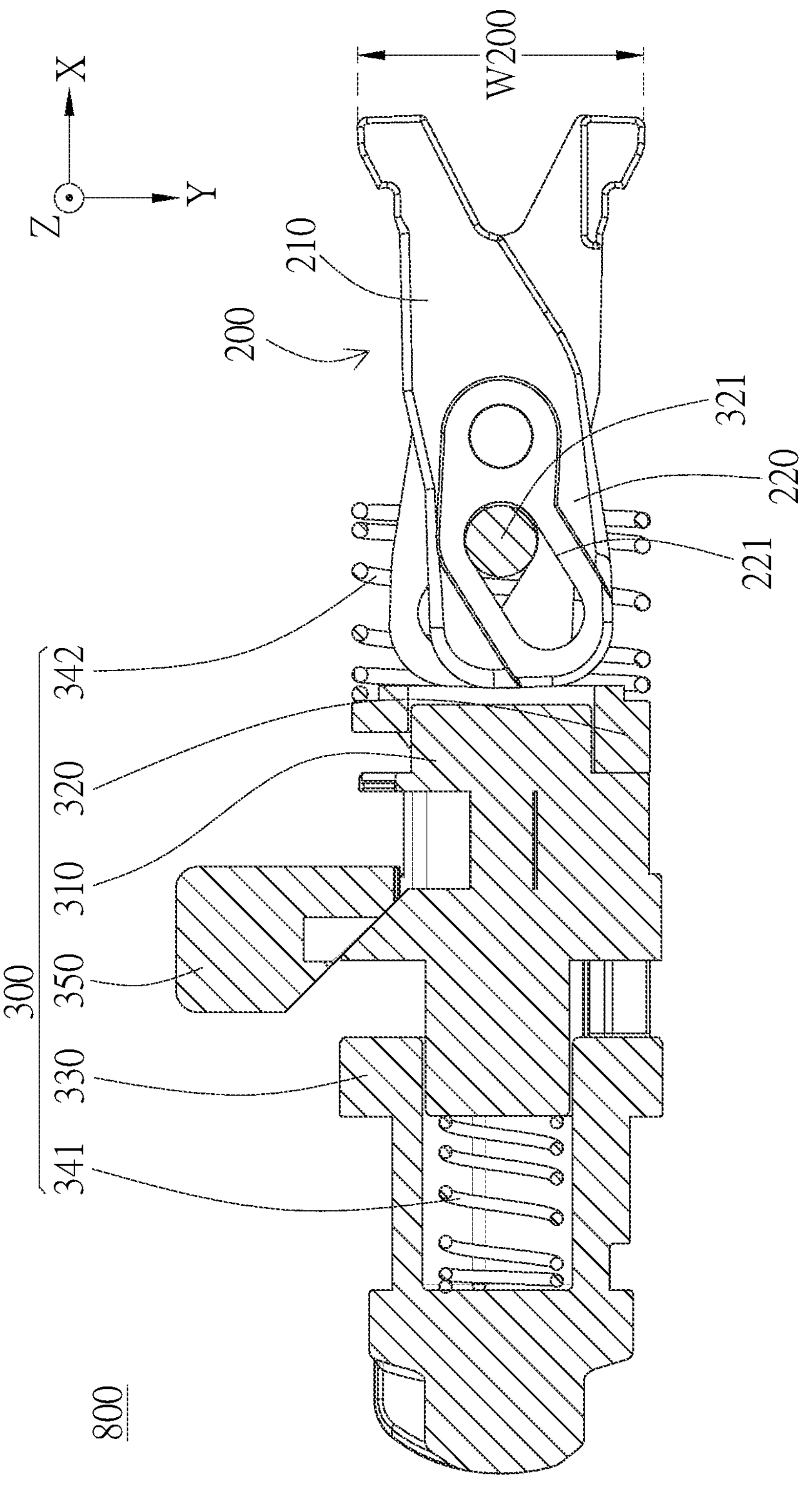

In the embodiment shown in FIGS. 2A and 2B, the lock body 400 includes a locking piece 410, and when the lock body 400 is locked (for example, the key lock core is rotated by a key or a word wheel of the number lock core is dialed to a locking position), for example, the locking piece 410 is located at one end of a rod piece located in a path of the first driving part 310 moving along the X-axis direction, the first driving part 310 moving along the X-axis direction is restricted. More specifically, in an embodiment shown in FIG. 3A to 3E, only partial elements are described to make the drawings more concise and easy-to-understand. In this embodiment, when the lock body 400 is locked, the locking piece 410 is moved to the first driving part 310 relative to another side of the second driving part, that is, the first driving part 310 is moved to be away from a path of the second driving part 320 along the X-axis direction, and further restricts the first driving part 310 moving away from the second driving part 320 along the X-axis direction, so that the force applying part 350 is prevented from moving towards inside of the housing 100. In an embodiment shown in FIG. 3E, the first elastic force provided by the first elastic apparatus 341 brings the first driving part 310 close to the second driving part 320, and the second elastic force provided by the second elastic apparatus 342 keeps the second driving part 320 away from the rotating hook 200. Because the first elastic force is greater than the second elastic force, the first driving part 310 abuts against and pushes the second driving part 320 close to the rotating hook 200. Therefore, the driving portion 321 located in the driving groove 221 opens the front end 210 of the rotating hook 200 by a width W200, thereby achieving a locking effect. In different embodiments, when the lock body 400 is locked, the first driving part 310 may be restricted by other means. For example, the locking piece 410 is directly clamped with the first driving part 310 or abuts against a side wall of the first driving part 310.

In an embodiment shown in FIG. 4A to 4D, when the lock body 400 is unlocked, the locking piece 410 moves away from the first driving part 310 relative to another side of the second driving part 320 along the Z-axis direction, that is, the locking piece 410 is not in a path where the first driving part 310 moves along the X-axis direction to be away from the second driving part 320. Therefore, the force applying part 350 is movable towards the inside of the housing 100. In an embodiment shown in FIG. 5A to 5E, when the force applying part 350 is driven to move towards the inside of the housing 100 by the external force, the first driving part 310 may be pushed to move along the X-axis direction away from the rotating hook 200, so that the second driving part 320 is driven to move along the X-axis direction away from the rotating hook 200, and drive the driving portion 321 to move along the X-axis direction to rotate the rotating hook 200 relative to the housing 100 along the plane parallel to the X-Y plane. More specifically, in an embodiment shown in FIG. 5E, because the force applying part 350 is subjected to the external force and the sum of the component of the external force along the X-axis direction and the component of the second elastic force along the X-axis direction is greater than the component of the first elastic force along the X-axis direction, the second driving part 320 may be away from the rotating hook 200 by the second elastic force. Therefore, the driving portion 321 in the driving groove 221 pushes a side wall of the driving groove 221 to close the front end 210 of the rotating hook 200, that is, the opening width W200 of the front end 210 is reduced, so that the driving portion 321 in the driving groove 221 can freely disengage from a fastening position, such as the lock hole, thereby achieving an unlocking effect.

Figure 7A:
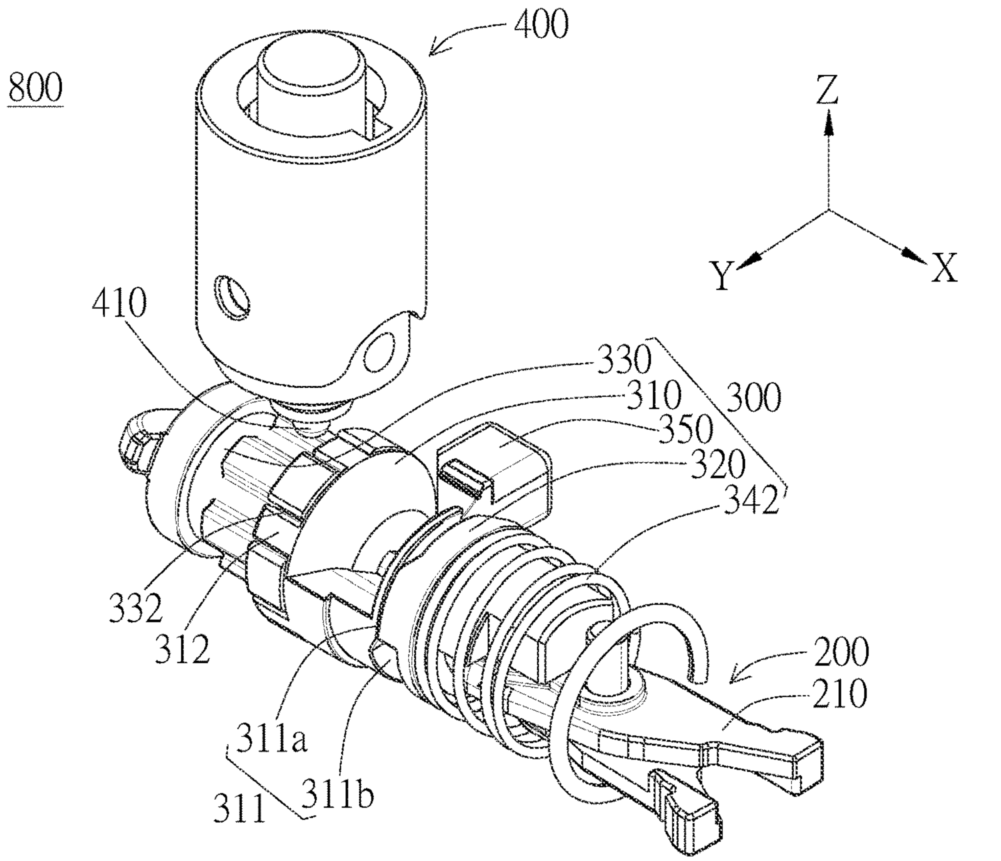
Figure 7B:
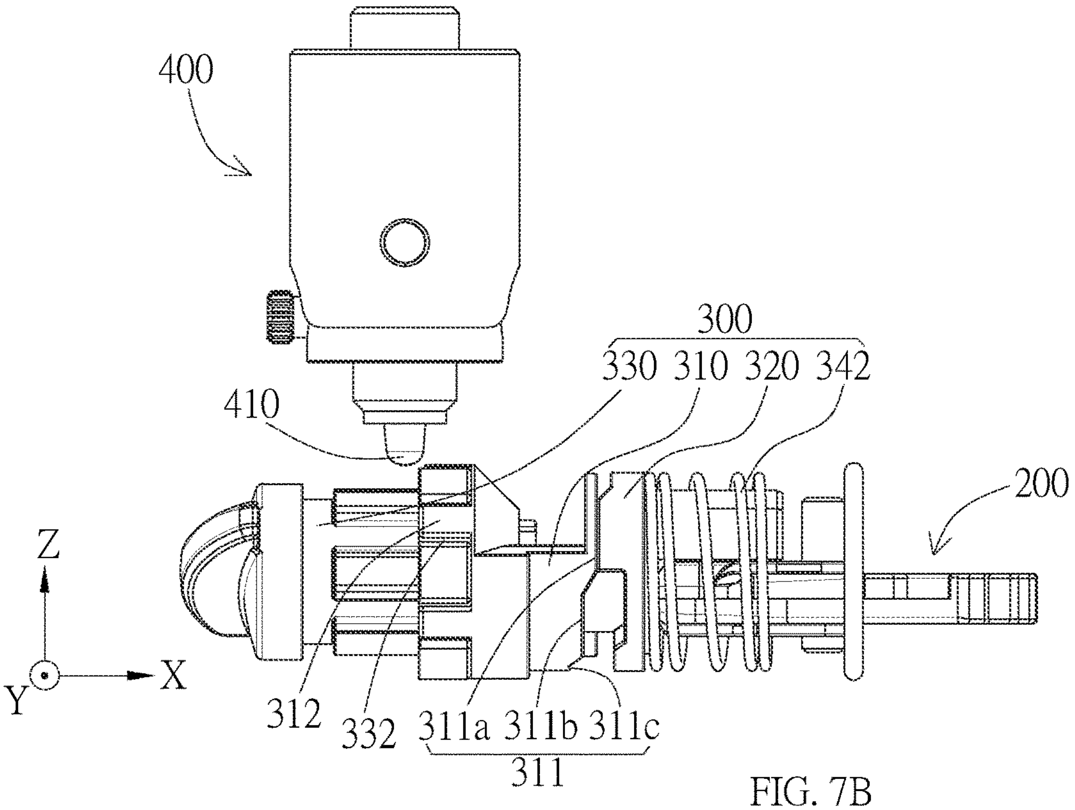
Figure 7C:
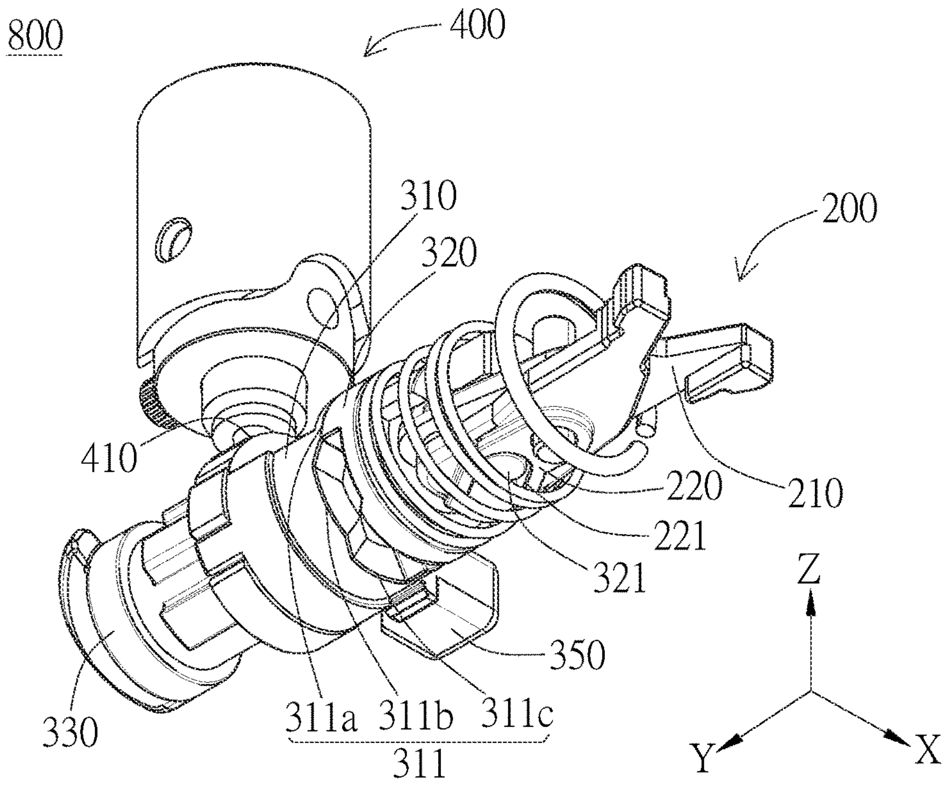
Figure 7D:
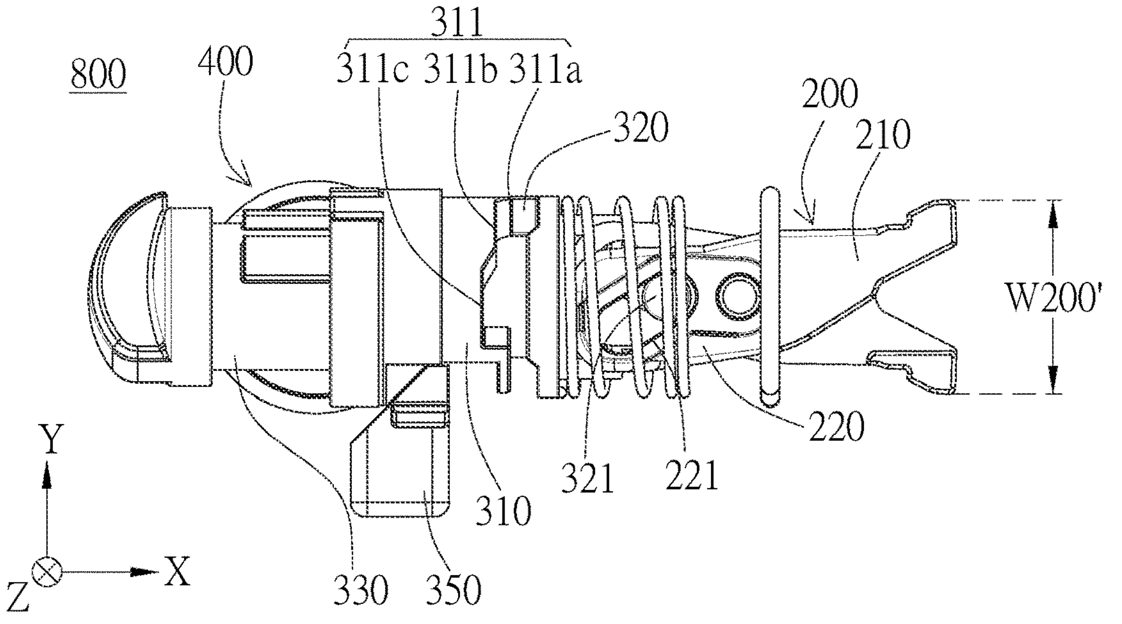
Figure 8A:
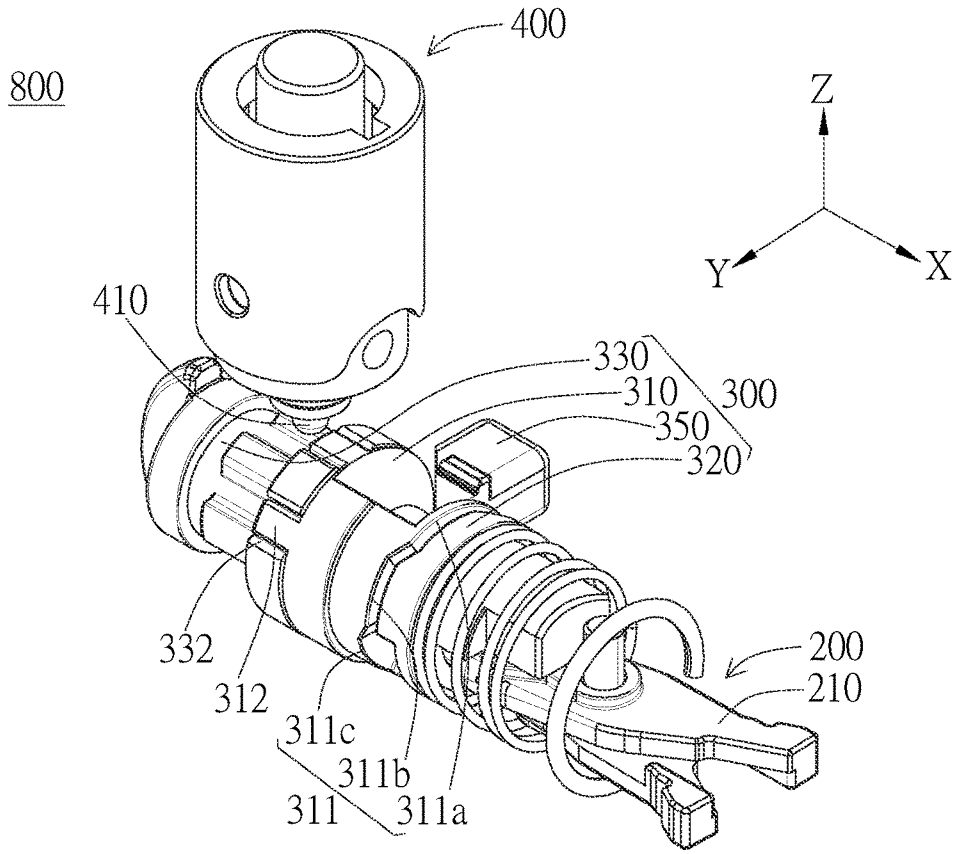
Figure 8B:
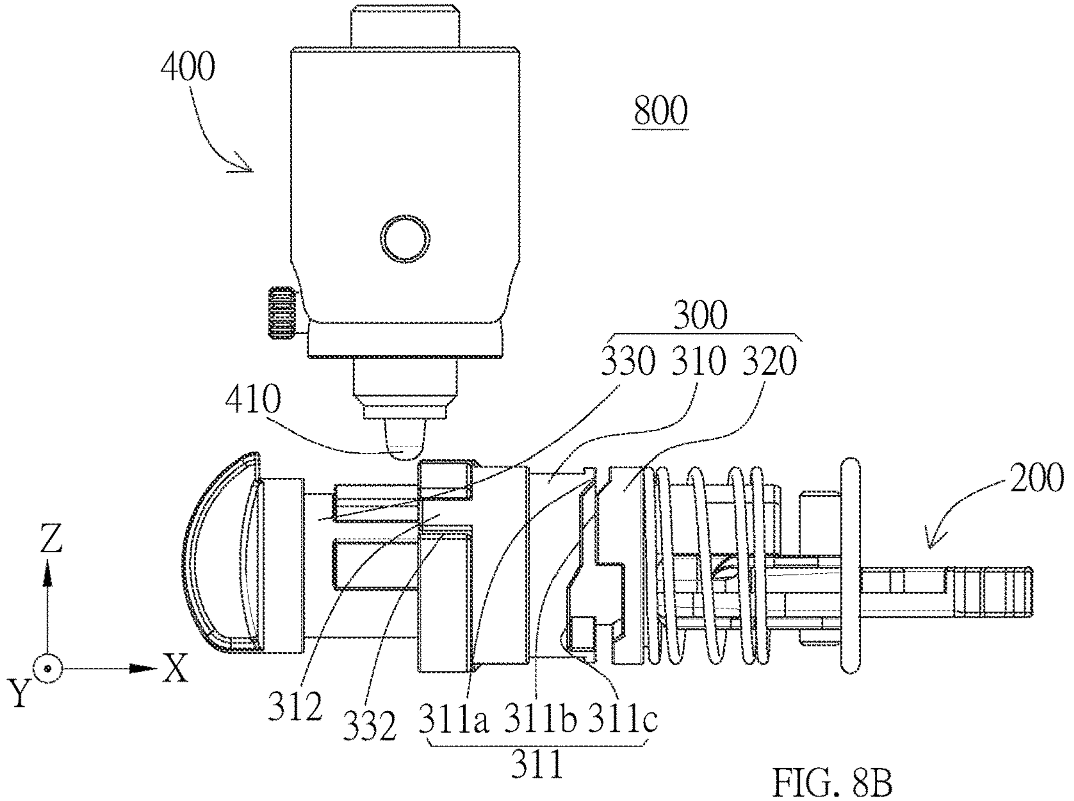
Figure 8C:
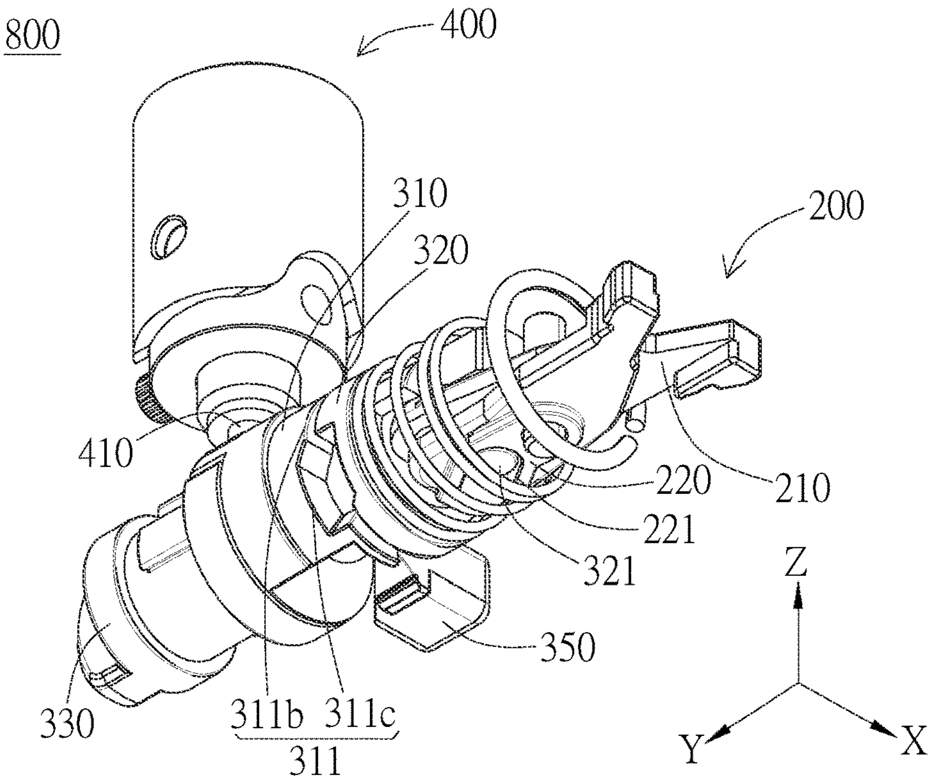
Figure 8D:
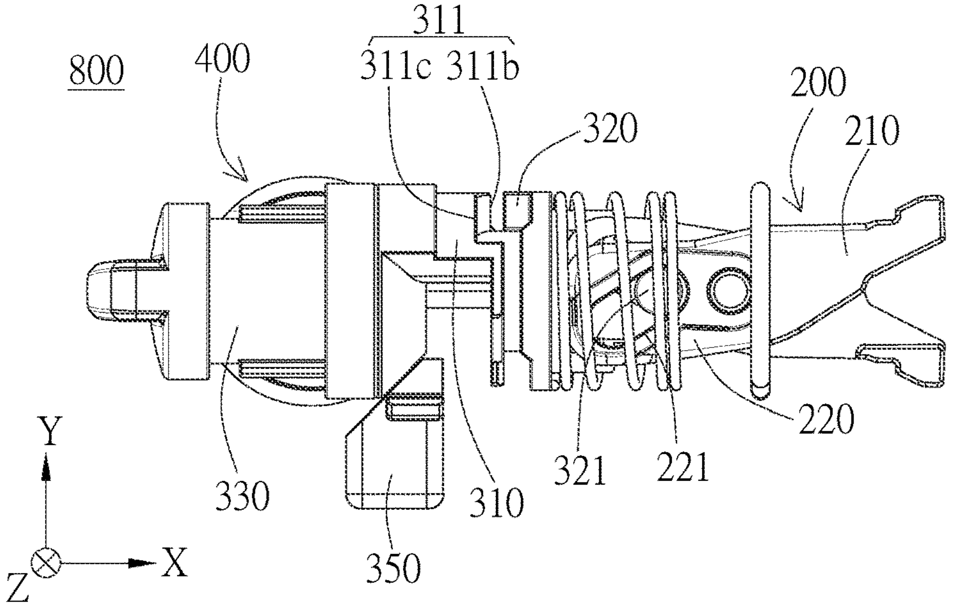

In an embodiment, the opening width of the front end of the rotating hook of the lock of the present invention may be changed to be suitable for the lock holes of different sizes. Further, in the embodiment shown in FIG. 2A, the first driving part 310 further includes a guide slope 311 abutting against the second driving part 320. The guide slope 311 includes a step 311*a*, a step 311*b*, and a step 311*c*. The step 311*a*, step 311*b*, and step 311*c* each have a segment difference along the X-axis direction. The first driving part 310 is rotatable along the plane parallel to the Y-Z plane, so that one of the step 311*a*, step 311*b*, and step 311*c* abuts against the second driving part 320, and changes a position of the second driving part 320, so that the driving portion 321 is driven to move along the X-axis direction to rotate the rotating hook 200 relative to the housing 100 along the plane parallel to the X-Y plane, thereby changing the opening width of the front end 210. In an embodiment shown in FIG. 6A to 7D, the first driving part 310 abuts against the second driving part 320 with the step 311*a*. As shown in FIG. 7D, the opening width of the front end 210 is W200'.

More specifically, in the embodiment shown in FIG. 2A, the lock 800 further includes a third driving part 330 arranged on another side of the first driving part 310 relative to the second driving part 320. The first driving part 310 includes a limiting pin 312 arranged at one end of the first driving part 310 adjacent to the third driving part 330. The third driving part 330 includes a limiting part 332 arranged at an end that is of a side surface 330*a* of the third driving part 330 and that is adjacent to the first driving part 310. The third driving part 330 includes a limiting groove 333, and the limiting groove 333 is arranged outside the limiting part 332 on the side face 330*a* of the third driving part 330 along the X-axis direction. In an embodiment, the limiting part 332 is a recessed portion between projections 332*a* and the limiting groove 333 communicates with the limiting part 332 to form a recessed groove, but this is not limited thereto. The third driving part 330 may be selectively moved to a position in which the limiting part 332 and the limiting pin 312 are dislocated and not clamped shown in FIG. 4A to 4C, or to a position in which the limiting part 332 and the limiting pin 312 are clamped shown in FIG. 6A to 6C.

Figure 4A:
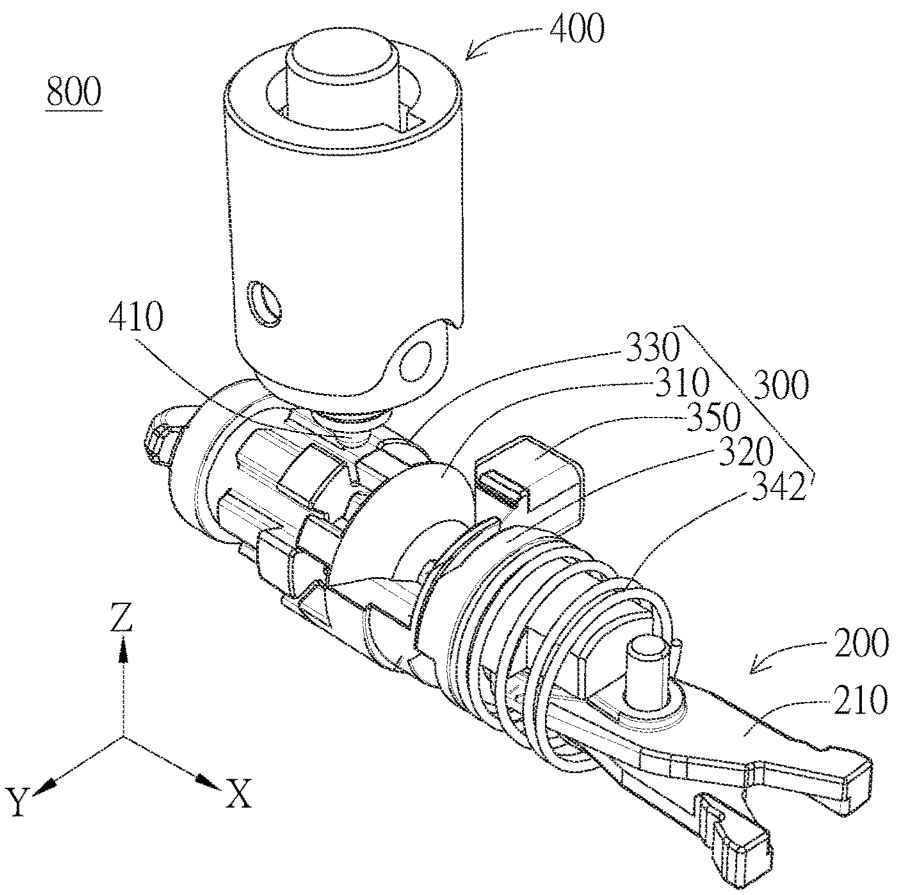
Figure 4B:
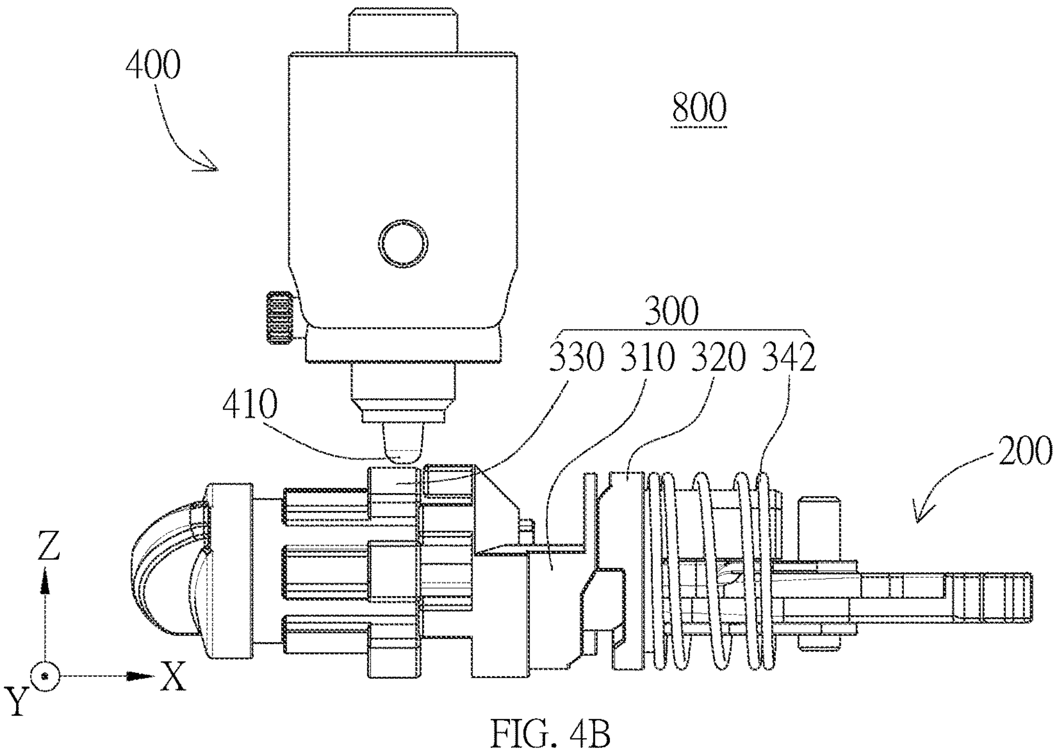
Figure 4C:
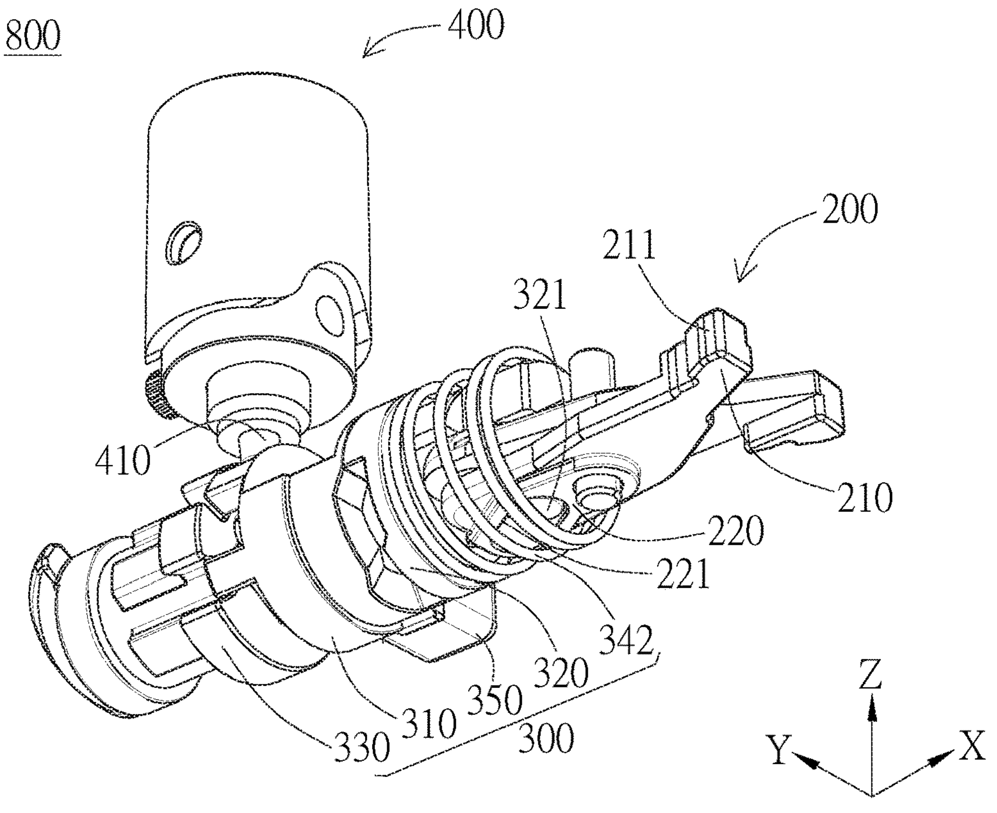
Figure 4D:
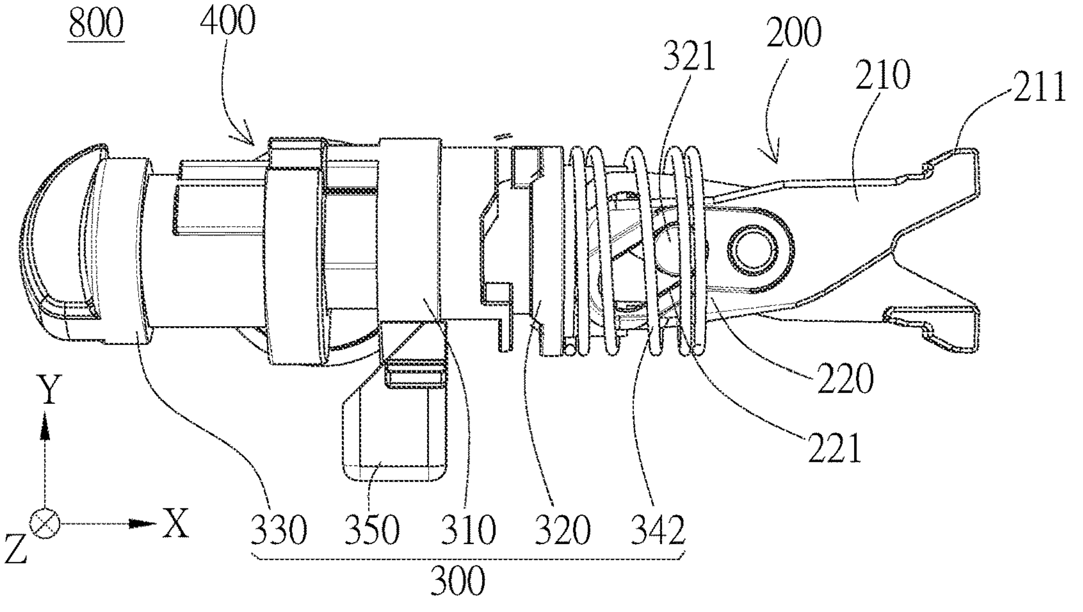
Figure 5A:
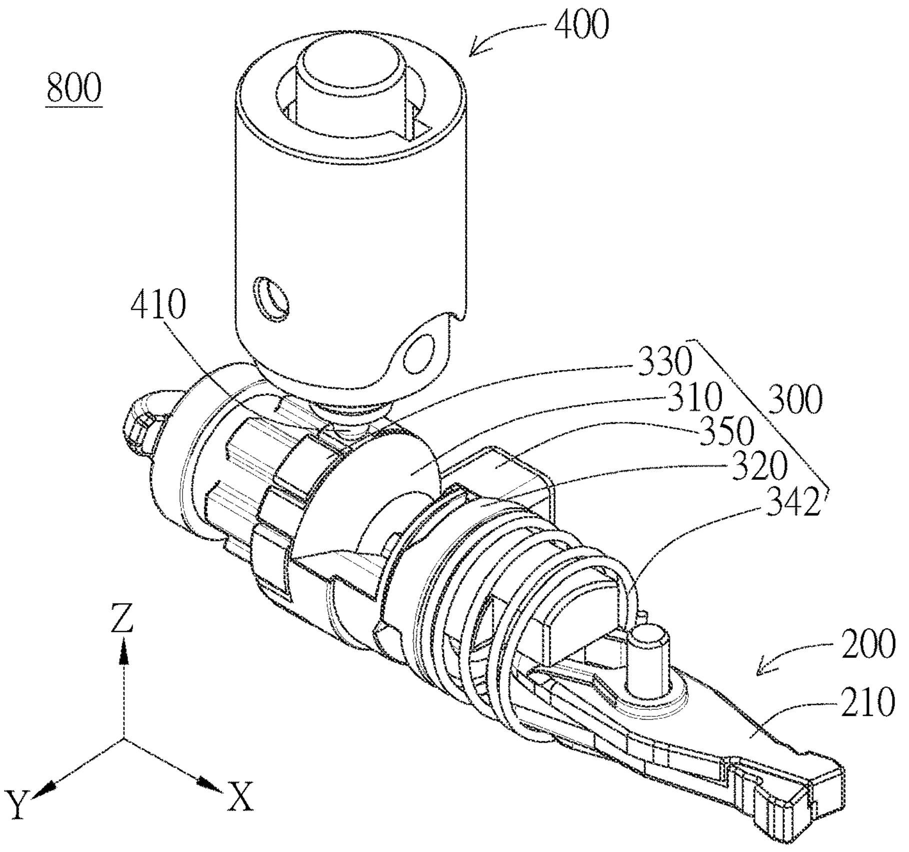
Figure 5B:
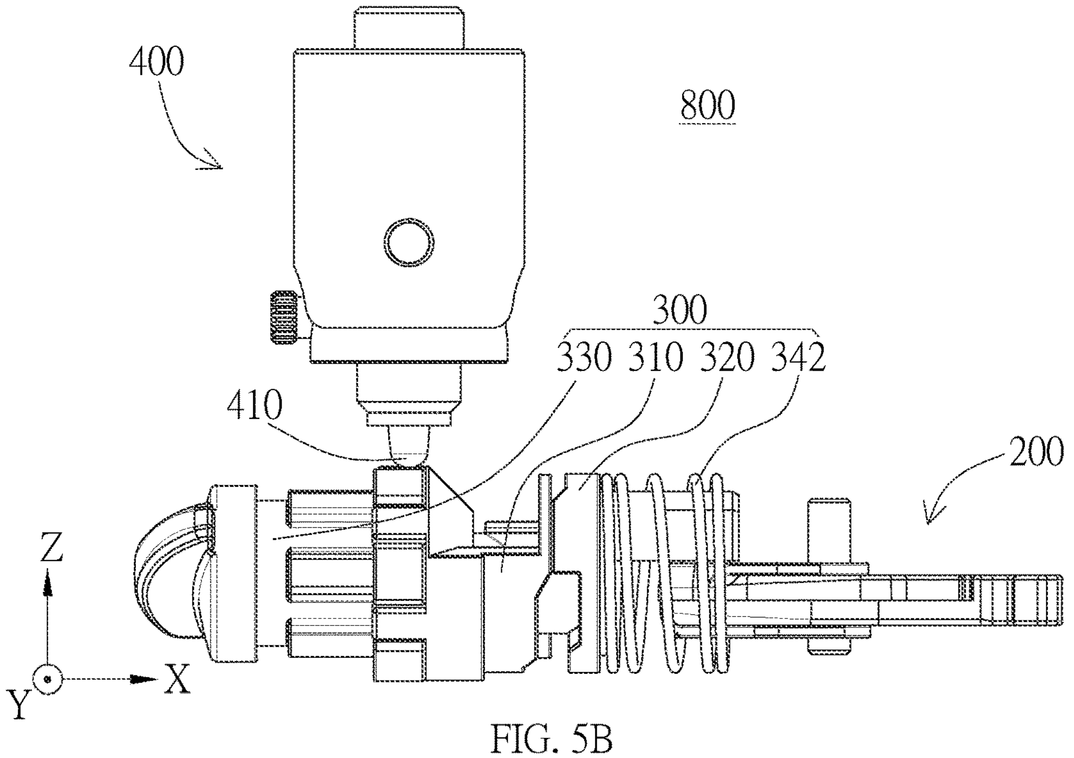
Figure 5C:
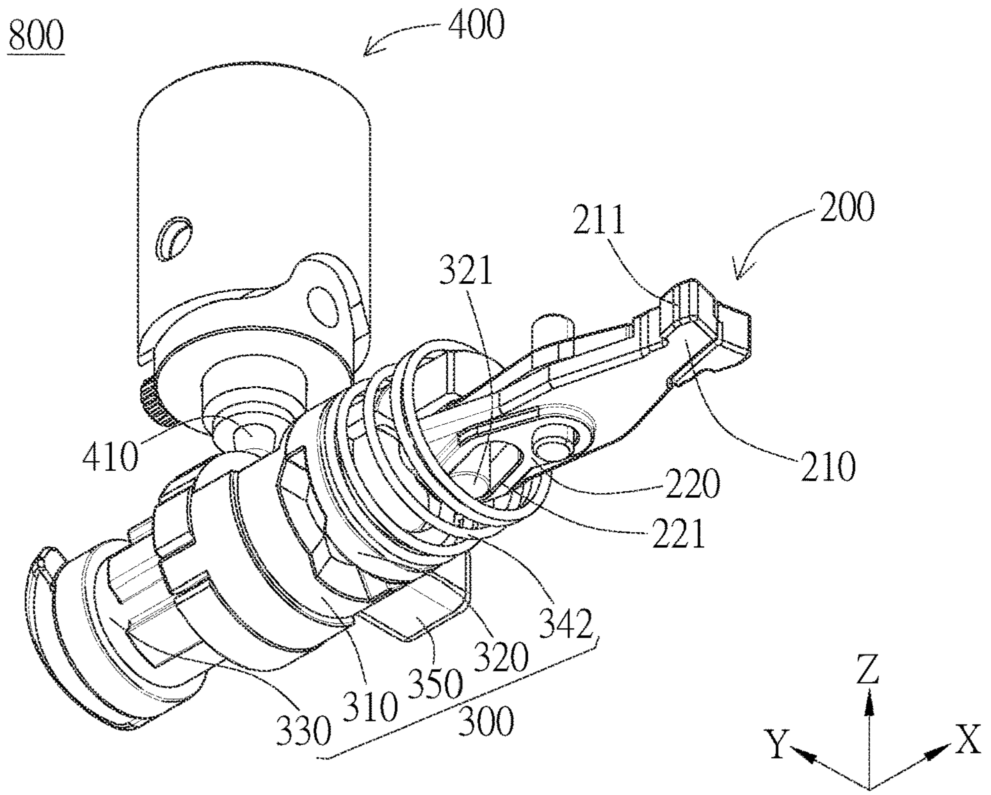
Figure 5D:
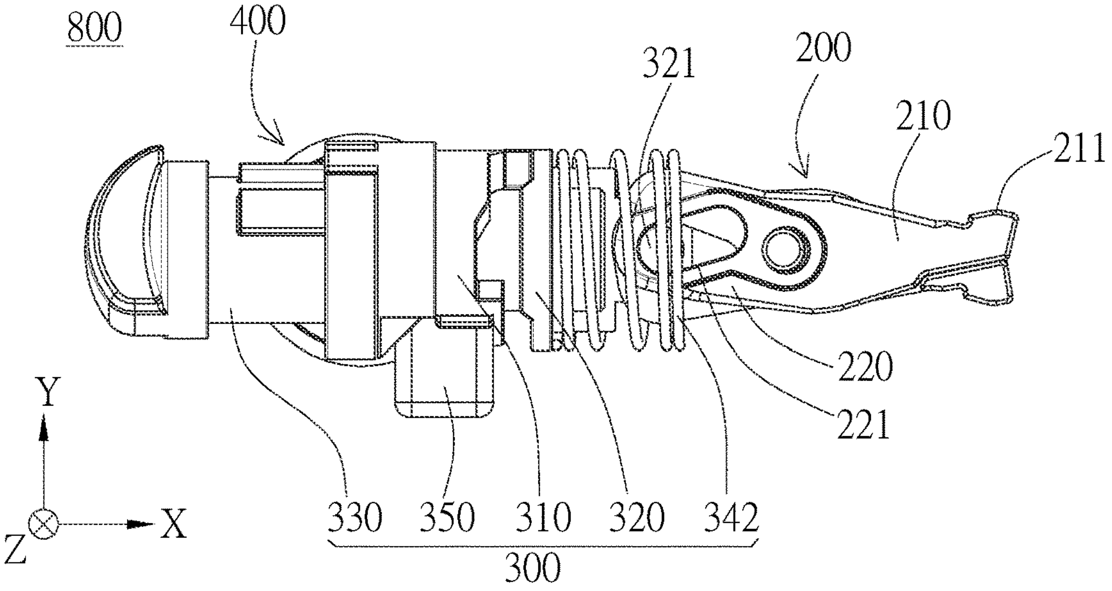
Figure 5E:
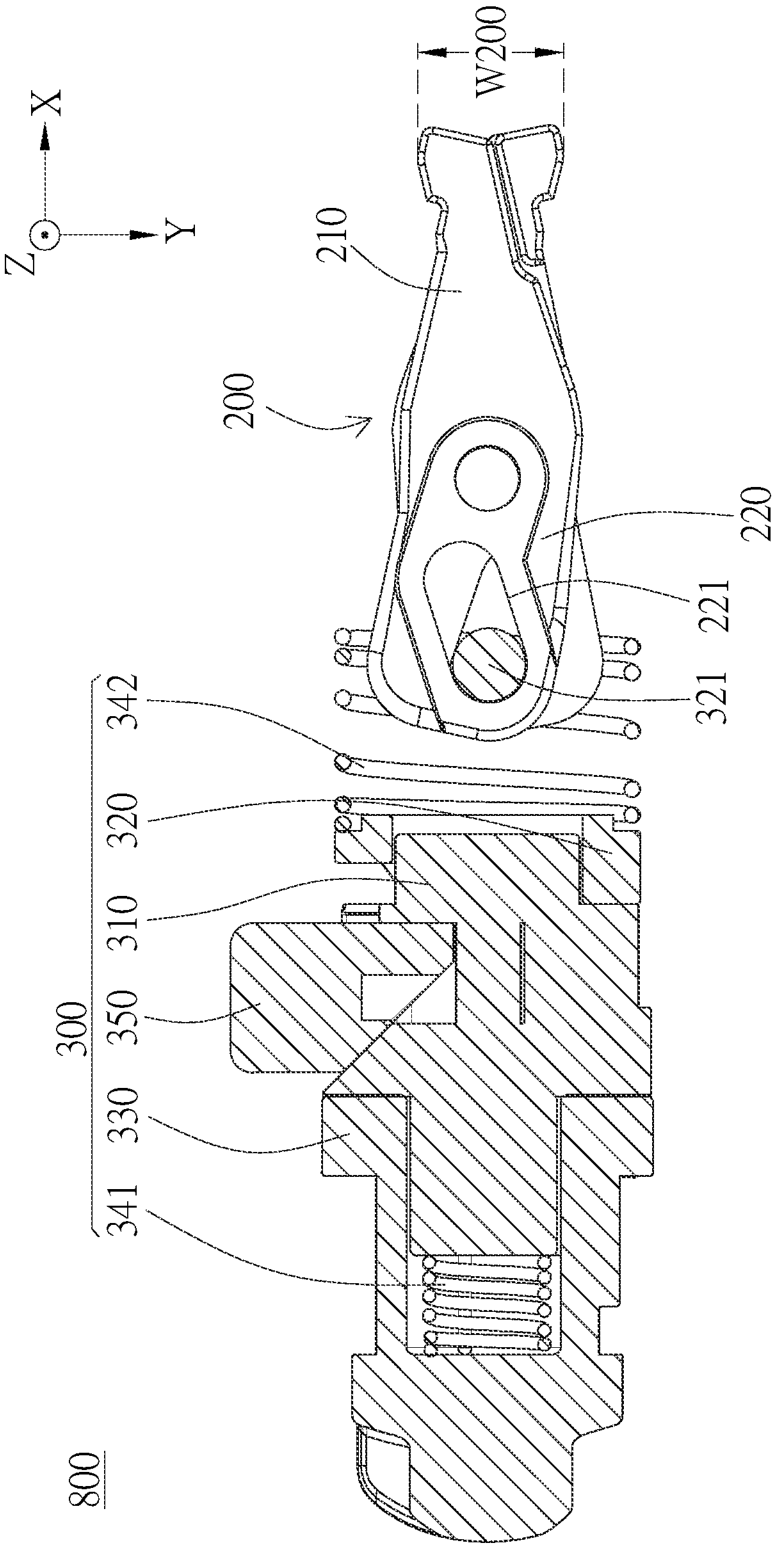
Figure 6A:
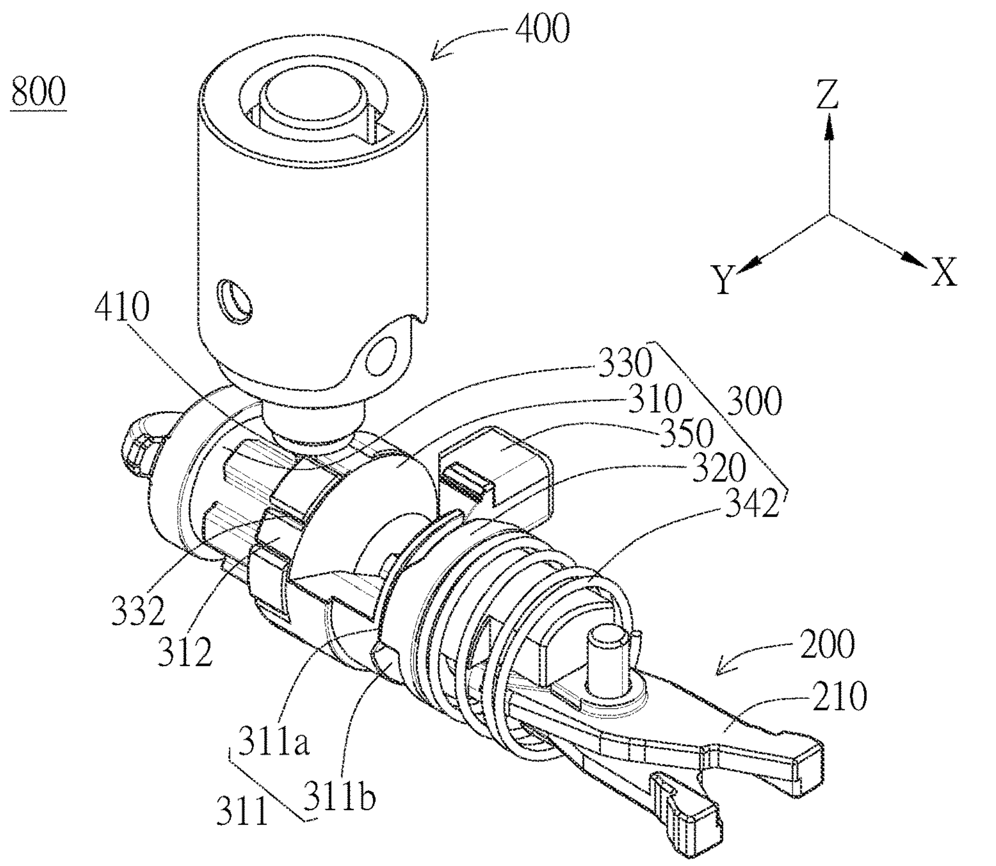
FIG. 6A to 10D are schematic diagrams of embodiments of a lock of the present invention for changing an opening width of a front end.
Figure 6B:
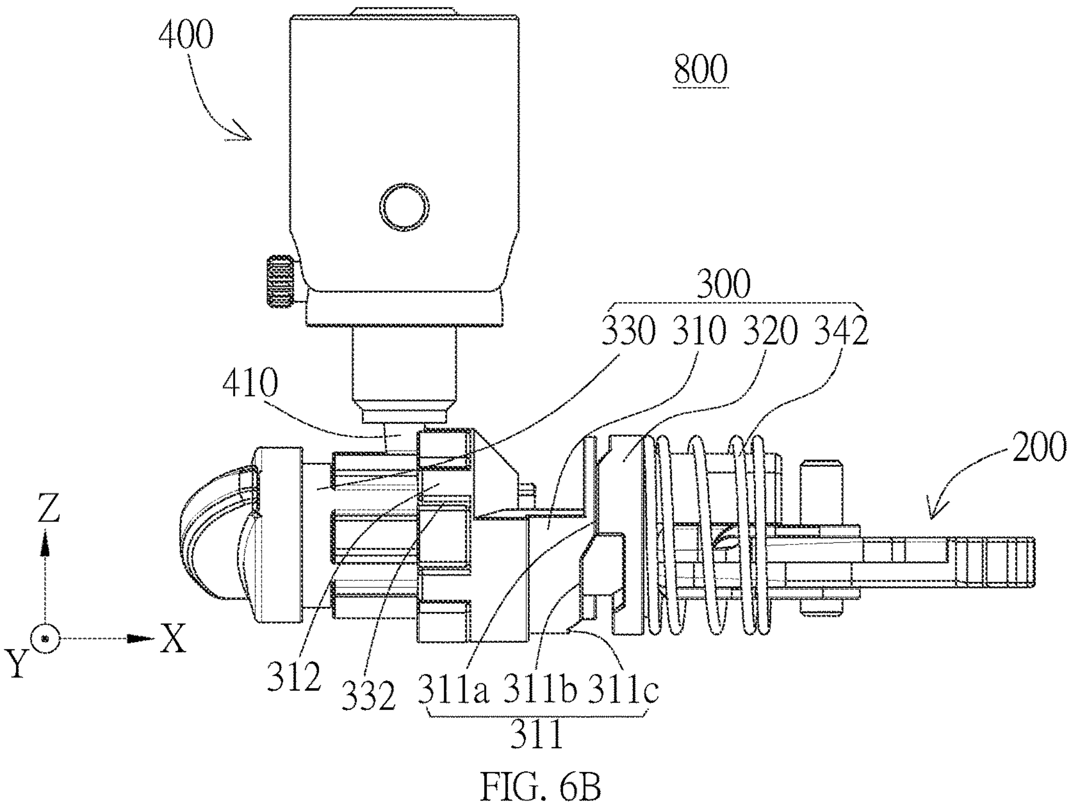
Figure 6C:
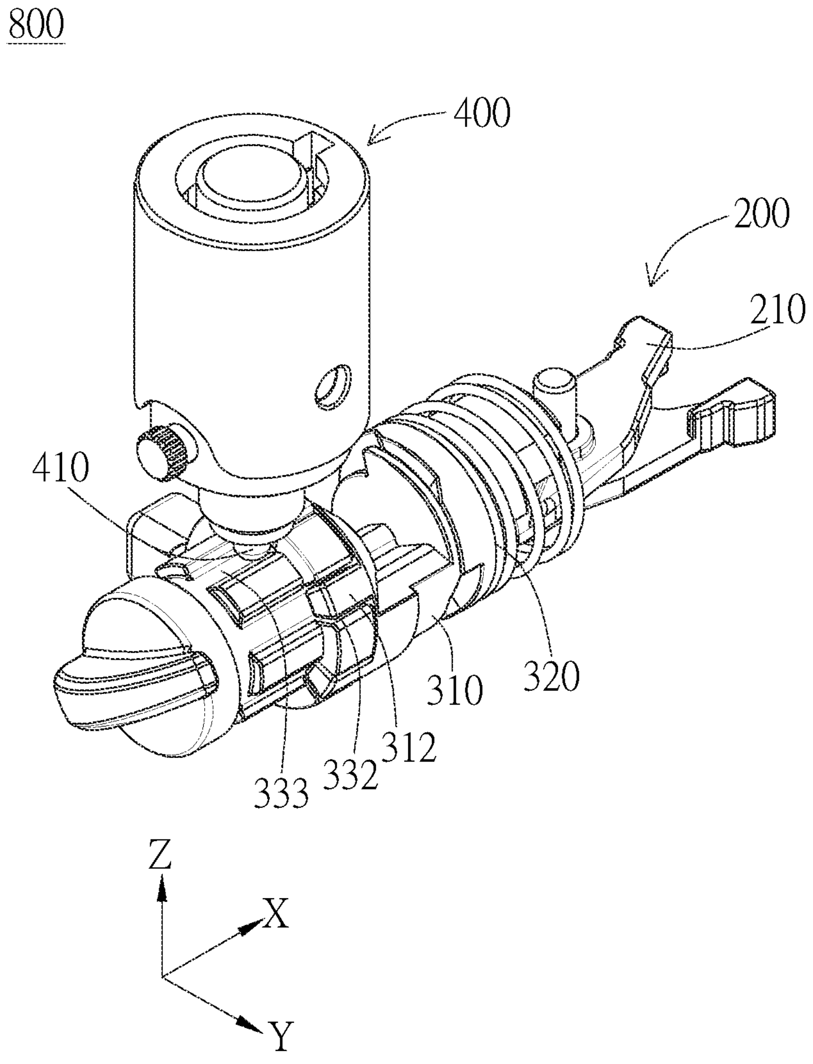

More specifically, in an embodiment shown in FIG. 4A to 4C, when the limiting part 332 and the limiting pin 312 are not clamped, and the locking piece 410 interferes with the third driving part 330, the third driving part 330 is freely rotatable along the plane parallel to the Y-Z plane, that is, the third driving part 330 is rotatable for 360° in this plane. In an embodiment shown in FIG. 6A to 6C, the third driving part 330 is movable towards the first driving part 310 so that the limiting part 332 is clamped with the limiting pin 312. In an embodiment shown in FIG. 6C, when the lock body 400 is locked, the locking piece 410 extends into the limiting groove 333 to be clamped with the third driving part 330 and restricts the third driving part rotating along the plane parallel to the Y-Z plane. In different embodiments, when the lock body 400 is locked, the third driving part 330 may be restricted by other means. For example, the locking piece 410 is directly clamped with a concave hole of the third driving part 330 or abuts against the side face of the third driving part 330.

Figure 9A:
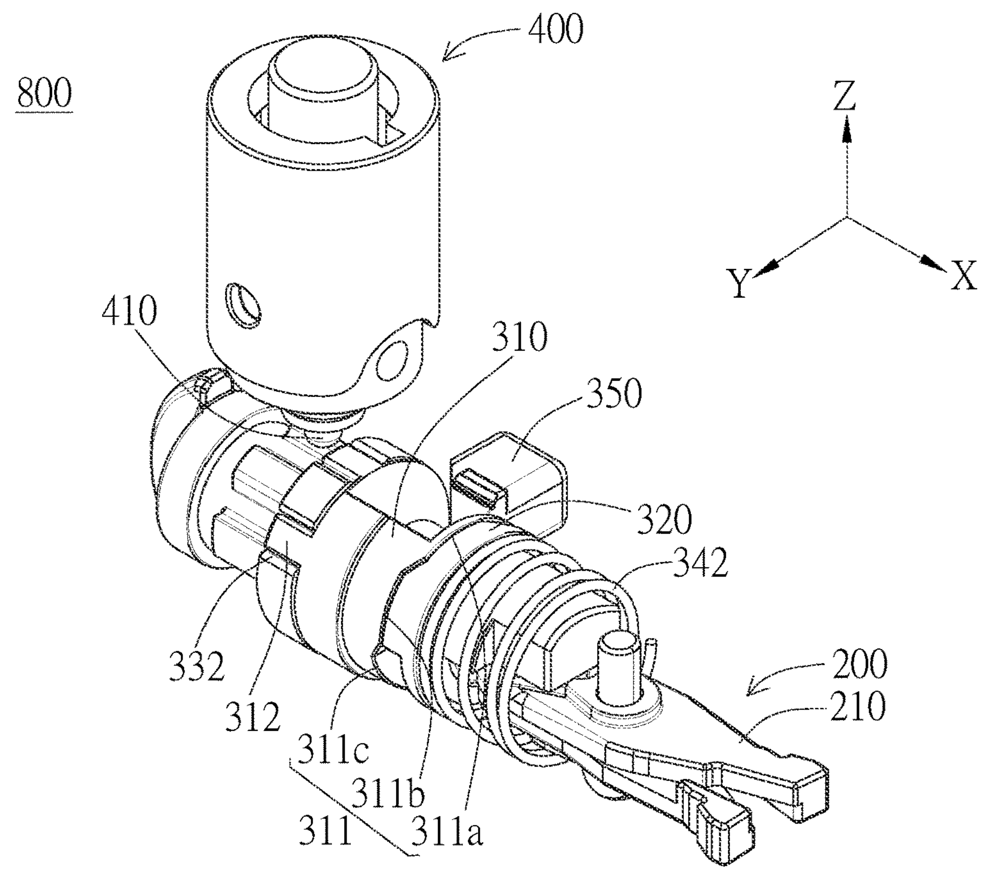
Figure 9B:
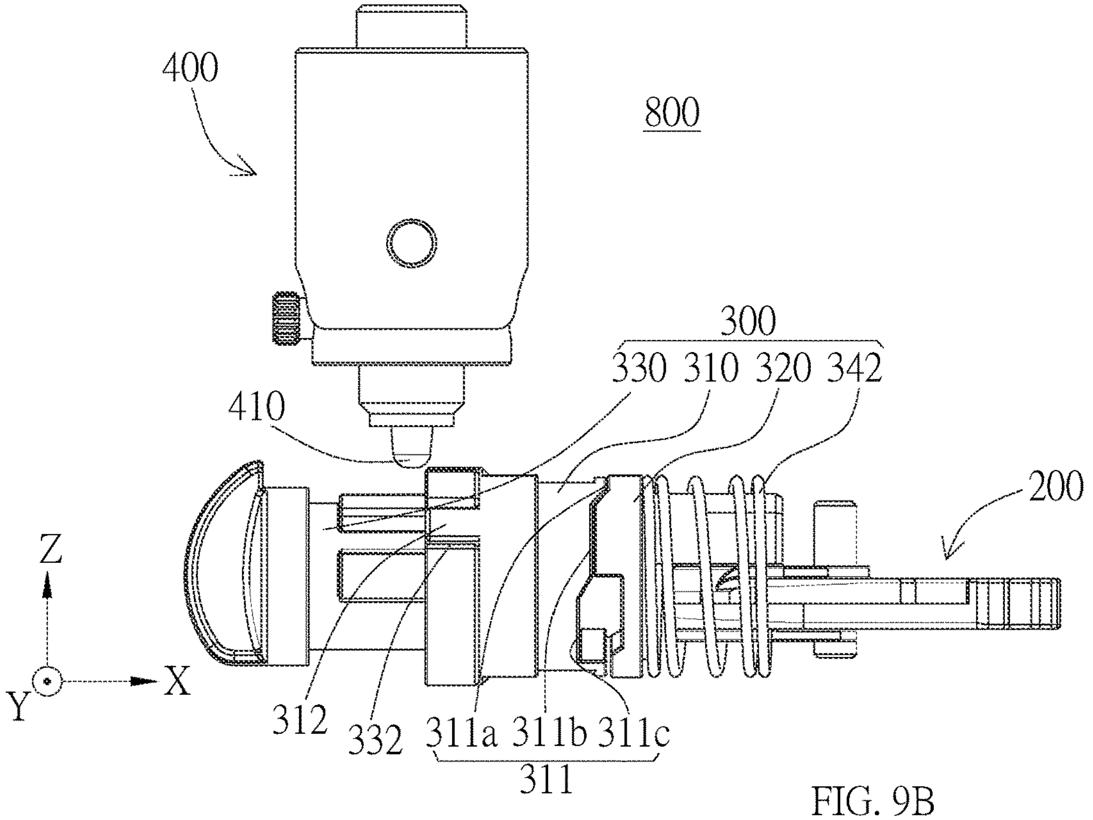
Figure 9C:
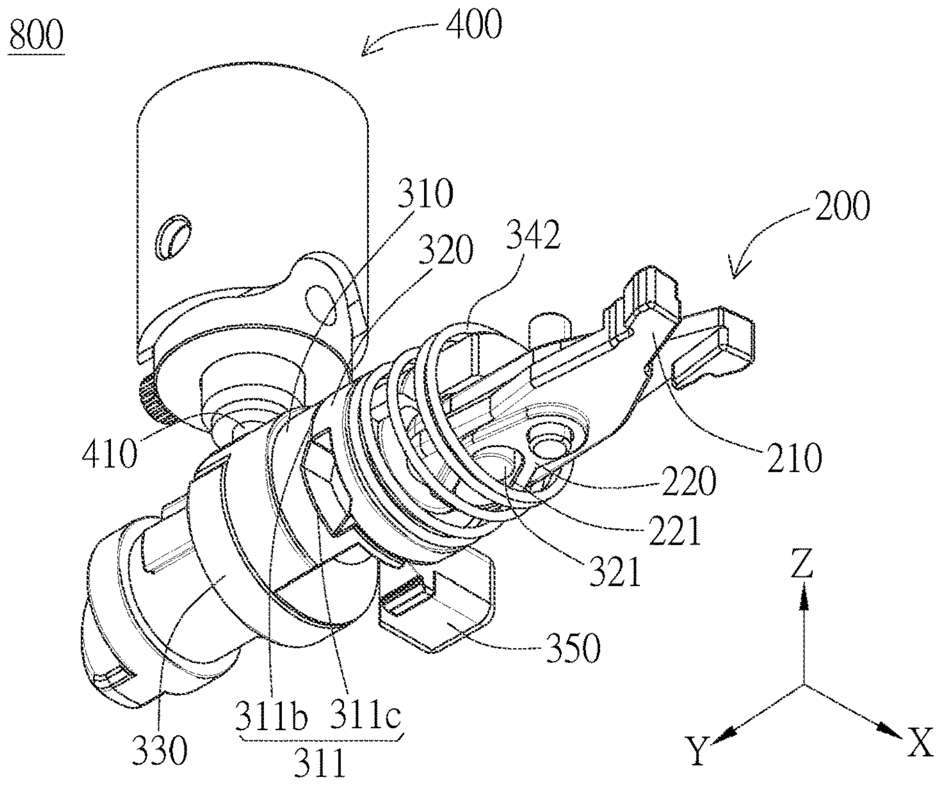
Figure 9D:
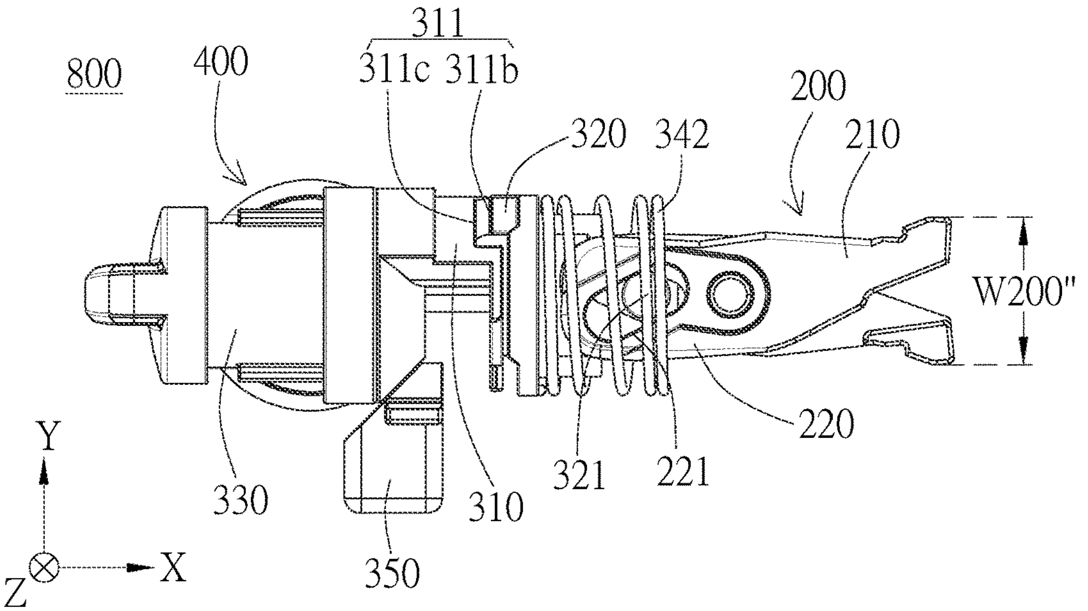
Figure 9E:
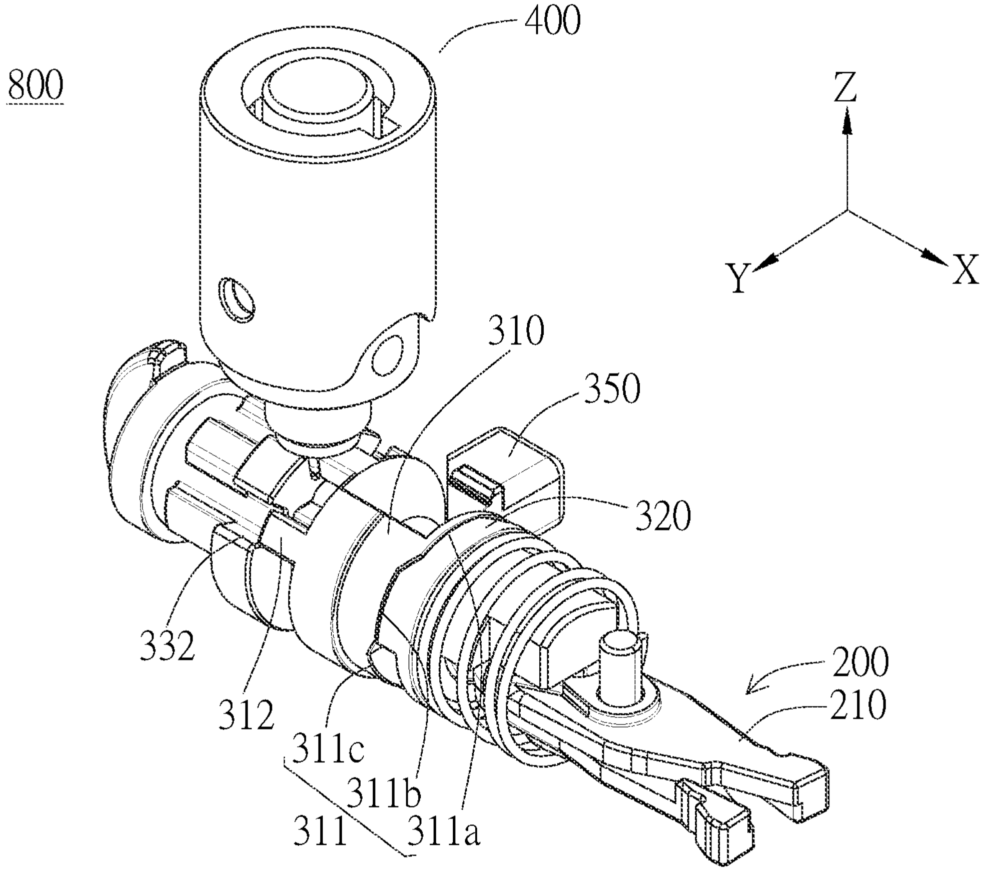
Figure 10A:
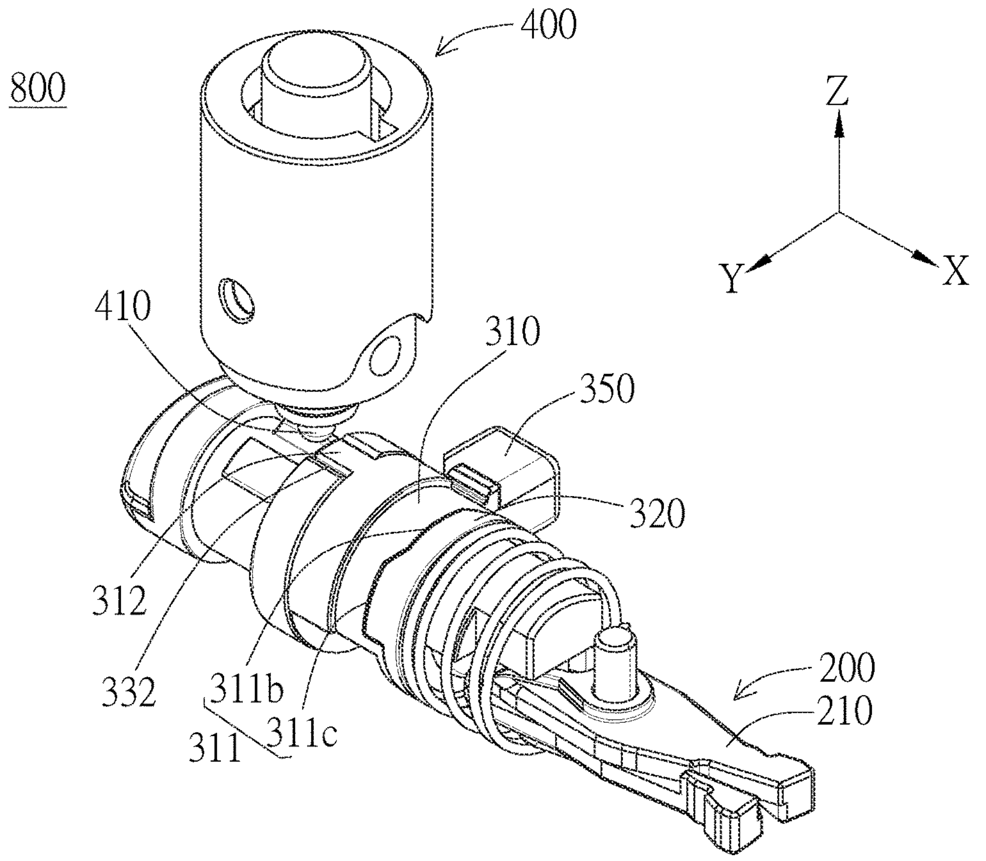
Figure 10B:
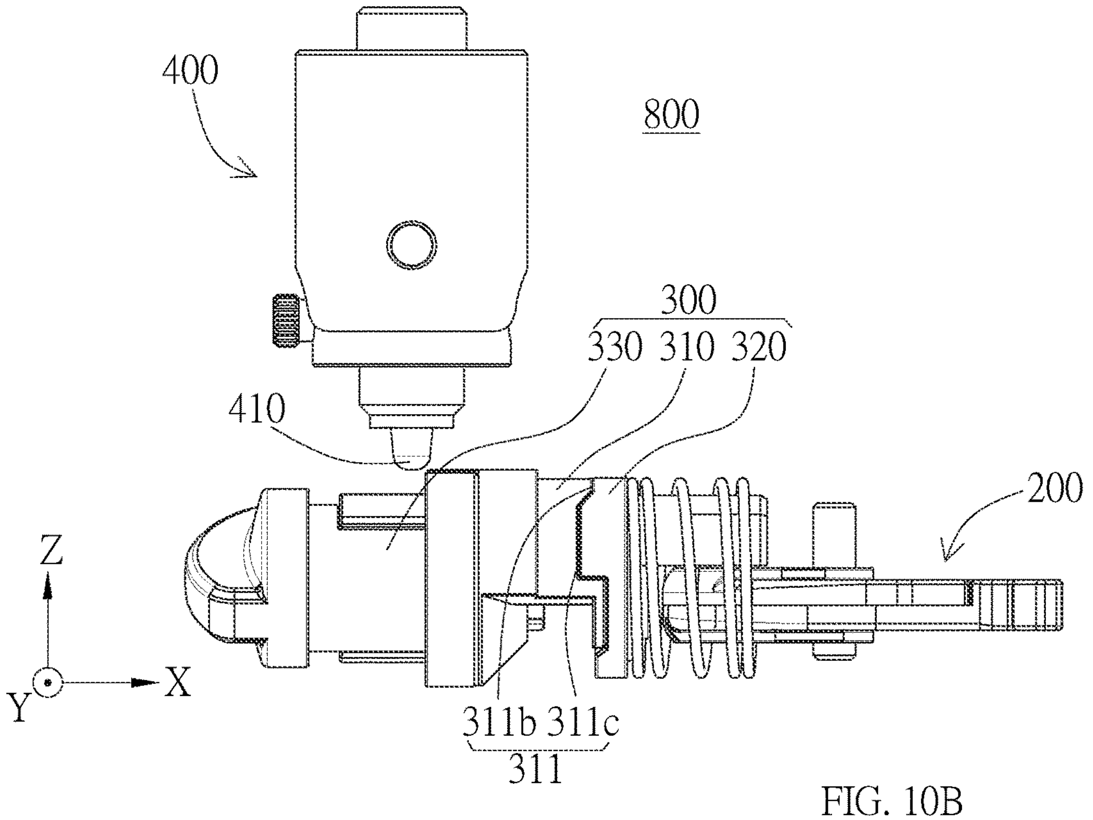
Figure 10C:
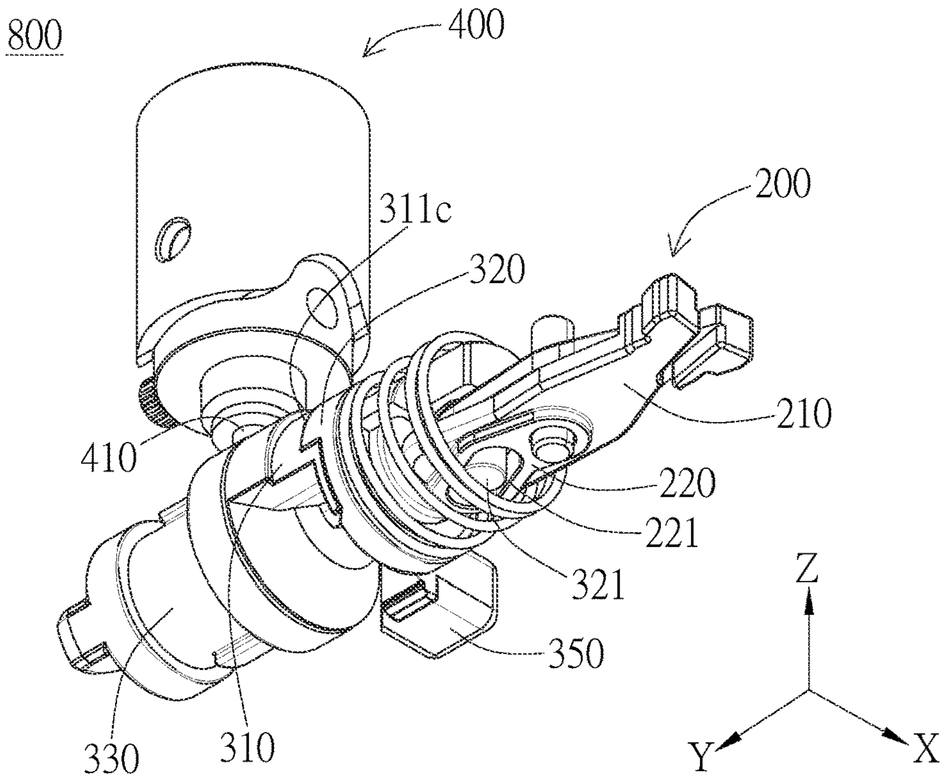
Figure 10D:
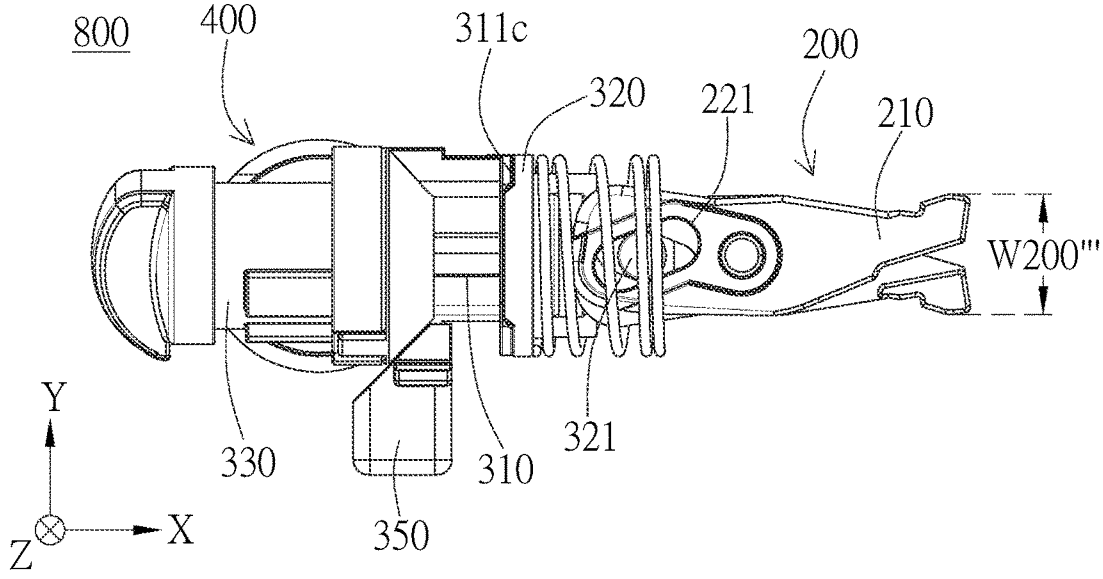

In an embodiment shown in FIG. 7A to 7D, when the lock body 400 is unlocked, the locking piece 410 leaves the limiting groove 333, to release restriction on the third driving part 330 rotating along the plane parallel to the Y-Z plane. Therefore, the third driving part 330 clamped with the first driving part 310 is rotatable with the first driving part 310 along the plane parallel to the Y-Z plane. The another end of the third driving part 330 relative to the first driving part 310 may include a second force receiving portion 334 extending out of the rear end 120 of the housing 100 (refer to FIG. 1B) to facilitate a user to apply force to rotate the third driving part 330. Accordingly, the user may rotate the third driving part 330 with the first driving part 310 along the plane parallel to the Y-Z plane to a position of an embodiment shown in FIG. 8A to 8D. In this case, the second elastic apparatus 342 provides a second elastic force to push the second driving part 320 to move towards the first driving part 310, and in an embodiment shown in FIG. 9A to 9D, to make the second driving part 320 abut against the step 311*b* of the first driving part 310 and the driving portion 321 is driven to move along the X-axis direction to rotate the rotating hook 200, so that the opening width of the front end 210 is set to W200" as shown in FIG. 9D. Then, the third driving part 330 may move away from the first driving part 310 to release the clamping between the limiting part 332 and the limiting pin 312, so that the third driving part 330 is independently rotatable without driving the first driving part 310 to rotate. In addition, when the third driving part 330 drives the first driving part 310 to rotate together along the plane parallel to the Y-Z plane to a position in an embodiment shown in FIG. 10A to 10D, the first driving part 310 abuts against the second driving part 320 with the step 311*c*. As shown in FIG. 10D, the front end 210 is opened by a width W200'".

In other words, if the user wants to change the opening width of the front end 210 of the rotating hook 200, the third driving part 330 may be pushed towards the first driving part 310 to be clamped with each other, then a force is applied to the second force receiving portion 334 to rotate the third driving part 330, and drives the first driving part 310 to rotate to abut against the second driving part 320 with a specific step, thereby driving the driving portion 321 in the driving groove 221 to move along the X-axis direction to rotate the rotating hook 200, so that the opening width of the front end 210 is changed. Then, the third driving part 330 is pulled away from the first driving part 310 so as to release the clamping between the first driving part 310 and the third driving part 330, so as to prevent the opening width of the front end 210 from changing due to accidental rotation of the third driving part 330. Further, the first driving part 310 may freely rotate together with the third driving part 330 along the plane parallel to the Y-Z plane, that is, the user can rotate the third driving part 330 in the same direction, so that the opening width of the front end 210 changes cyclically. In the embodiment shown in FIGS. 7D, 9D, and 10D, the opening width of the front end 210 varies cyclically between a width W200', a width W200", and a width W200'". According to the foregoing descriptions, the lock 800 of the present invention may be used for different sizes of lock holes, and convenience of use can be increased.

Although the foregoing descriptions and drawings have disclosed exemplary embodiments of the present utility model, it should be understood that various additions, many modifications, and substitutions may be made thereto without departing from the spirit and scope of the principles of the present utility model as defined by the appended claims. Those ordinarily skilled in the art of the present utility model will appreciate that the present utility model is applicable to modifications of many forms, structures, arrangements, proportions, materials, elements, and components. Therefore, the embodiments disclosed herein should be considered as illustrative and not restrictive of the present utility model. The scope of the present utility model should be defined by the appended claims, and covers the legal equivalents thereof, but is not limited to the foregoing descriptions.

What is claimed is:

1. A lock, comprising:

a housing, wherein an end of the housing comprises a front-end opening facing a same direction as an extending direction of an X-axis, the front-end opening deviates from a center of a section parallel to a Y-Z plane of the end, and the X-axis, a Y-axis, and a Z-axis are orthogonal;

a rotating hook, arranged in the housing and rotatable relative to the housing, and comprising a front end and a rear end, wherein the front end at least partially extends out of the front-end opening, and the rear end extends in an opposite direction to the front end;

a driving apparatus, arranged in the housing, and movable to change an opening width of the front end; and a lock body, arranged in the housing, wherein when the lock body is locked, the lock body restricts movement of the driving apparatus;

wherein the rear end is provided with a driving groove, and the driving apparatus comprises a driving portion extending into the driving groove along a Z-axis direction, when the lock body is unlocked, the driving portion is movable along the X-axis direction to rotate the rotating hook relative to the housing along a plane parallel to an X-Y plane to change the opening width of the front end, and when the lock body is locked, the lock body restricts the movement of the driving apparatus;

wherein the driving apparatus comprises:

a force applying part, penetrating the housing, movable along a plane parallel to the Y-Z plane, and comprising a force applying portion arranged in the housing;

a first driving part, arranged in the housing, abutting against the force applying part, and movable along the X-axis direction;

a second driving part, arranged between the first driving part and the rotating hook in the housing, abutting against the first driving part, movable along the X-axis direction, and comprising the driving portion;

a first elastic apparatus, arranged at a side of the first driving part to provide first elastic force, so that the first driving part approaches the second driving part; and a second elastic apparatus, arranged at a side of the second driving part to provide second elastic force, so that the second driving part is far away from the rotating hook, wherein a component of the first elastic force along the X-axis direction is larger than a component of the second elastic force along the X-axis direction, wherein when the lock body is unlocked, the force applying part is movable towards an inside of the housing, pushes the first driving part to move along the X-axis direction to be away from the rotating hook to move the second driving part along the X-axis direction to be away from the rotating hook, and drives the driving portion to move along the X-axis direction to rotate the rotating hook relative to the housing along a plane parallel to the X-Y plane.

2. The lock according to claim 1, wherein the lock body comprises a locking piece, and when the lock body is locked, the locking piece is located on a path of the first driving part moving along the X-axis direction, to restrict the first driving part moving along the X-axis direction.

3. The lock according to claim 2, wherein the first driving part further comprises a guide slope abutting against the second driving part, the guide slope is provided with a plurality of steps, the plurality of steps have a segment difference in the X-axis direction, the first driving part is rotatable along the plane parallel to the Y-Z plane to make one of the plurality of steps abut against the second driving part and change a position of the second driving part in the X-axis direction, to drive the driving portion to move along the X-axis direction, make the rotating hook rotate relative to the housing along the plane parallel to the X-Y plane, and change the opening width of the front end.

4. The lock according to claim 3, further comprising a third driving part, arranged on another side of the first driving part relative to the second driving part, wherein when the lock body is unlocked, the third driving part can be clamped with the first driving part and drives the first driving part to rotate along the plane parallel to the Y-Z plane; and when the lock body is locked, the locking piece is clamped with the third driving part to restrict the third driving part rotating along the plane parallel to the Y-Z plane.

5. The lock according to claim 4, wherein the first driving part comprises a limiting pin arranged at an end of the first driving part adjacent to the third driving part; and the third driving part comprises a limiting part arranged at an end that is on a side surface of the third driving part and that is adjacent to the first driving part, and the third driving part is movable towards the first driving part to clamp the spacing part with the limiting pin.

6. The lock according to claim 5, wherein the third driving part comprises a limiting groove, arranged at a position outside the limiting part on the side surface of the third driving part along the X-axis direction; and when the lock body is locked, the locking piece extends into the limiting groove to restrict the third driving part rotating along the plane parallel to the Y-Z plane.

7. A lock, comprising:

a housing, an end of the housing comprising a front-end opening;

a rotating hook, arranged in the housing and rotatable relative to the housing, and comprising a front end and a rear end, wherein the front end at least partially extends out of the front-end opening, the rear end extends in an opposite direction to the front end, and the rear end is provided with a driving groove disposed inside;

a driving apparatus, arranged in the housing and movable to change an opening width of the front end, wherein the driving apparatus comprises a driving portion extending into the driving groove along a Z-axis direction; and a lock body, arranged in the housing, wherein when the lock body is unlocked, the driving portion is movable along an X-axis direction to rotate the rotating hook relative to the housing along a plane parallel to an X-Y plane to change the opening width of the front end, and when the lock body is locked, the lock body restricts movement of the driving apparatus, wherein an X-axis, a Y-axis, and a Z-axis are orthogonal;

wherein the front-end opening faces a same direction as an extending direction of the X-axis, and deviates from a center of a section parallel to a Y-Z plane of the end;

wherein the driving apparatus comprises:

a force applying part, penetrating the housing, movable along a plane parallel to the Y-Z plane, and comprising a force applying portion arranged in the housing;

a first driving part, arranged in the housing, abutting against the force applying part, and movable along the X-axis direction;

a second driving part, arranged between the first driving part and the rotating hook in the housing, abutting against the first driving part, movable along the X-axis direction, and comprising the driving portion;

a first elastic apparatus, arranged at a side of the first driving part to provide first elastic force, so that the first driving part approaches the second driving part; and a second elastic apparatus, arranged at a side of the second driving part to provide second elastic force, so that the second driving part is far away from the rotating hook, wherein a component of the first elastic force along the X-axis direction is larger than a component of the second elastic force along the X-axis direction, wherein when the lock body is unlocked, the force applying part is movable towards an inside of the housing, pushes the first driving part to move along the X-axis direction to be away from the rotating hook to move the second driving part along the X-axis direction to be away from the rotating hook, and drives the driving portion to move along the X-axis direction to rotate the rotating hook relative to the housing along a plane parallel to the X-Y plane.

8. The lock according to claim 7, wherein the lock body comprises a locking piece, and when the lock body is locked, the locking piece is located on a path of the first driving part moving along the X-axis direction, to restrict the first driving part moving along the X-axis direction.

9. The lock according to claim 8, wherein the first driving part further comprises a guide slope abutting against the second driving part, the guide slope is provided with a plurality of steps, the plurality of steps have a segment difference in the X-axis direction, the first driving part is rotatable along the plane parallel to the Y-Z plane to make one of the plurality of steps abut against the second driving part and change a position of the second driving part in the X-axis direction, to drive the driving portion to move along the X-axis direction, make the rotating hook rotate relative to the housing along the plane parallel to the X-Y plane, and change the opening width of the front end.

10. The lock according to claim 9, further comprising a third driving part, arranged on another side of the first driving part relative to the second driving part, wherein when the lock body is unlocked, the third driving part can be clamped with the first driving part and drives the first driving part to rotate along the plane parallel to the Y-Z plane; and when the lock body is locked, the locking piece is clamped with the third driving part to restrict the third driving part rotating along the plane parallel to the Y-Z plane.

11. The lock according to claim 10, wherein the first driving part comprises a limiting pin arranged at an end of the first driving part adjacent to the third driving part; and the third driving part comprises a limiting part arranged at an end that is on a side surface of the third driving part and that is adjacent to the first driving part, and the third driving part is movable towards the first driving part to clamp the spacing part with the limiting pin.

12. The lock according to claim 11, wherein the third driving part comprises a limiting groove, arranged at a position outside the limiting part on the side surface of the third driving part along the X-axis direction; and when the lock body is locked, the locking piece extends into the limiting groove to restrict the third driving part rotating along the plane parallel to the Y-Z plane.

* * * * *